(12) United States Patent
Ishida

(10) Patent No.: US 10,992,827 B2
(45) Date of Patent: Apr. 27, 2021

(54) INFORMATION PROCESSING SYSTEM, INFORMATION PROCESSING APPARATUS, INFORMATION PROCESSING METHOD, AND STORAGE MEDIUM TO EXECUTE LAYOUT PROCESSING

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/537,907

(22) Filed: Aug. 12, 2019

(65) Prior Publication Data

US 2020/0076963 A1    Mar. 5, 2020

(30) Foreign Application Priority Data

Aug. 30, 2018 (JP) .............................. JP2018-162153

(51) Int. Cl.
| | |
|---|---|
| *H04N 1/00* | (2006.01) |
| *G06T 11/60* | (2006.01) |
| *G06F 3/0482* | (2013.01) |
| *G06F 3/0484* | (2013.01) |
| *H04N 1/387* | (2006.01) |
| *G06F 3/12* | (2006.01) |

(52) U.S. Cl.
CPC ....... *H04N 1/00196* (2013.01); *G06F 3/0482* (2013.01); *G06F 3/04845* (2013.01); *G06F 3/1204* (2013.01); *G06F 3/1208* (2013.01); *G06F 3/1252* (2013.01); *G06F 3/1254* (2013.01); *G06T 11/60* (2013.01); *H04N 1/00143* (2013.01); *H04N 1/00188* (2013.01); *H04N 1/3871* (2013.01); *G06F 3/1288* (2013.01); *G06T 2200/24* (2013.01)

(58) Field of Classification Search
CPC .......... H04N 1/00196; H04N 1/00143; H04N 1/00188; H04N 1/3871; H04N 1/0044; H04N 1/00442; H04N 1/00456; G06T 11/60; G06T 2200/24; G06F 3/0482; G06F 3/1252; G06F 3/1254; G06F 3/04845; G06F 3/1204; G06F 3/1208; G06F 3/1288; G06F 3/1256; G06F 3/125; G06F 3/1285; G06K 15/1885
USPC ................................................ 358/1.15, 1.18
See application file for complete search history.

(56) References Cited

U.S. PATENT DOCUMENTS

| | | | |
|---|---|---|---|
| 2007/0070408 A1* | 3/2007 | Ono ................... | H04N 1/00183 358/1.15 |
| 2015/0169944 A1* | 6/2015 | Gotohda ............... | G06F 3/0483 382/118 |
| 2016/0112586 A1* | 4/2016 | Miyazaki ........... | H04N 1/00251 358/1.18 |

FOREIGN PATENT DOCUMENTS

JP    2018-124780 A    8/2018

* cited by examiner

*Primary Examiner* — Kent Yip
(74) *Attorney, Agent, or Firm* — Canon U.S.A., Inc. IP Division

(57) ABSTRACT

An information processing apparatus includes an analysis image generation unit configured to generate an analysis image in such a manner that the size of an image selected by a user is reduced in a client, an analysis image upload unit configured to upload the analysis image generated by the analysis image generation unit from the client to a server, and a print image upload unit configured to upload a print image to the server after uploading of the analysis image by the analysis image upload unit is completed.

22 Claims, 18 Drawing Sheets

FIG.7

| IMAGE ID | IMAGE CAPTURING DATE AND TIME | FOCUS | NUMBER OF FACES | PERSONAL ID ||||||| |
|---|---|---|---|---|---|---|---|---|---|---|
| | | | | 1 || 2 || 3 || ... |
| | | | | UPPER-LEFT POSITION | LOWER-RIGHT POSITION | UPPER-LEFT POSITION | LOWER-RIGHT POSITION | UPPER-LEFT POSITION | LOWER-RIGHT POSITION | |
| 1 | 2015/7/1 10:11:12 AM | GOOD | 6 | 40, 40 | 65, 65 | 90, 40 | 115, 65 | 10, 20 | 25, 35 | ... |
| 2 | 2015/7/1 10:12:30 AM | GOOD | 2 | 50, 100 | 100, 150 | 150, 125 | 190, 165 | 150, 125 | 190, 165 | ... |
| 3 | 2015/7/1 10:15:54 AM | GOOD | 0 | — | — | — | — | — | — | ... |
| ... | ... | ... | ... | ... | ... | ... | ... | ... | ... | ... |

FIG.9

| SCENE | IMAGE CAPTURING PERIOD (TIME) | | NUMBER OF CAPTURED IMAGES (PIECES) | | NUMBER OF CAPTURED PERSONS (PERSONS) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG.10A

| SCENE | IMAGE FEATURE OF MAIN SLOT | IMAGE FEATURE OF SUB-SLOT |
|---|---|---|
| TRAVEL | ZOOM-OUT IMAGE INCLUDING PERSON AND LANDSCAPE | CLOSE-UP OR PROFILE IMAGE |
| DAILY LIFE | CLOSE-UP OR PROFILE IMAGE | ZOOM-OUT IMAGE INCLUDING PERSON AND LANDSCAPE |
| CEREMONY | IMAGE OF TWO PERSONS STANDING CLOSE TO EACH OTHER | IMAGE OF MANY PEOPLE |

FIG.10B

| IMAGE ID | SCORE (OUT OF 50 POINTS) | |
|---|---|---|
| | MAIN SLOT (SCORE) | SUB-SLOT (SCORE) |
| 1 | 20 | 40 |
| 2 | 45 | 10 |
| 3 | 10 | 20 |
| ... | ... | ... |

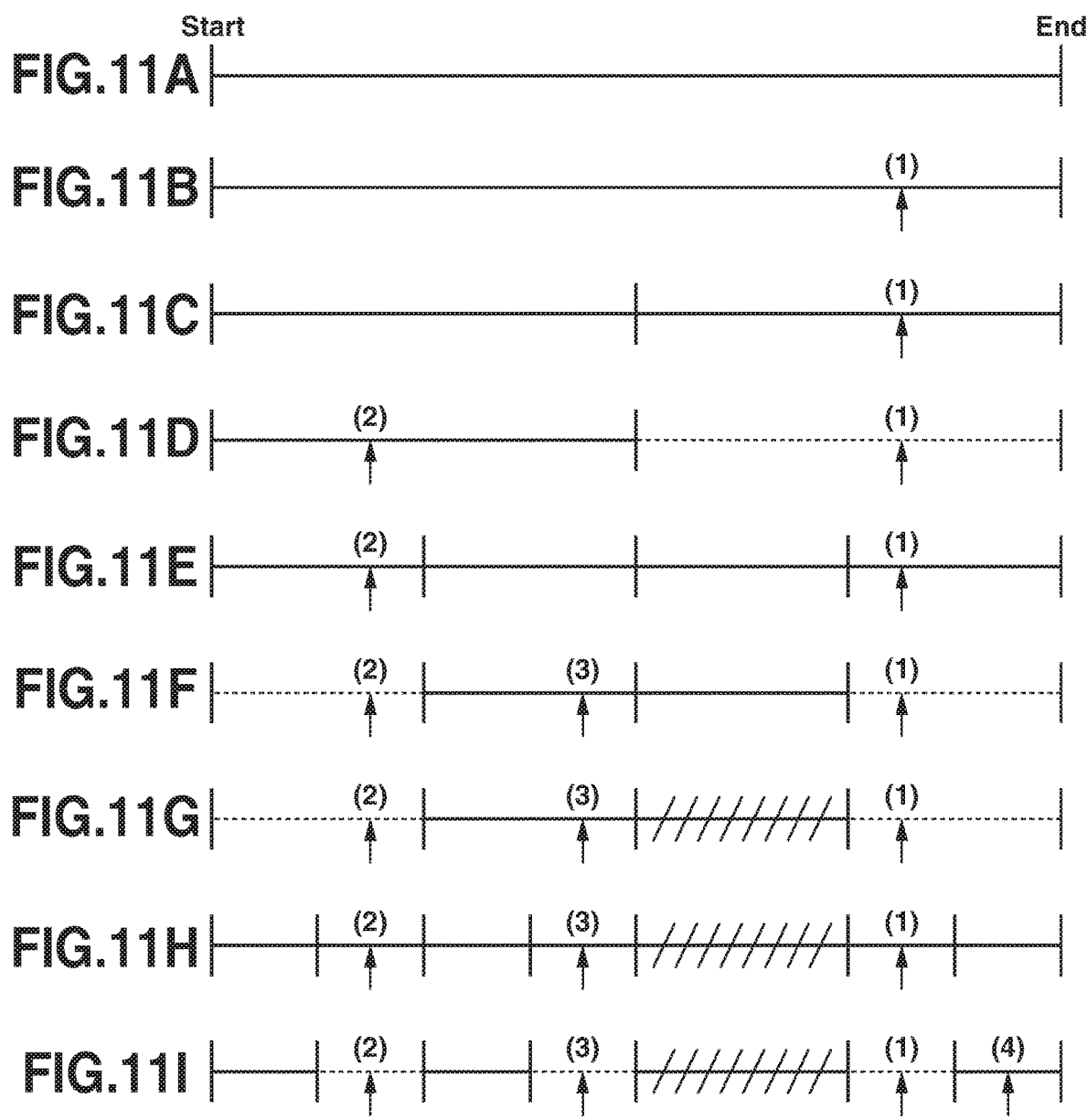

DATE AND TIME

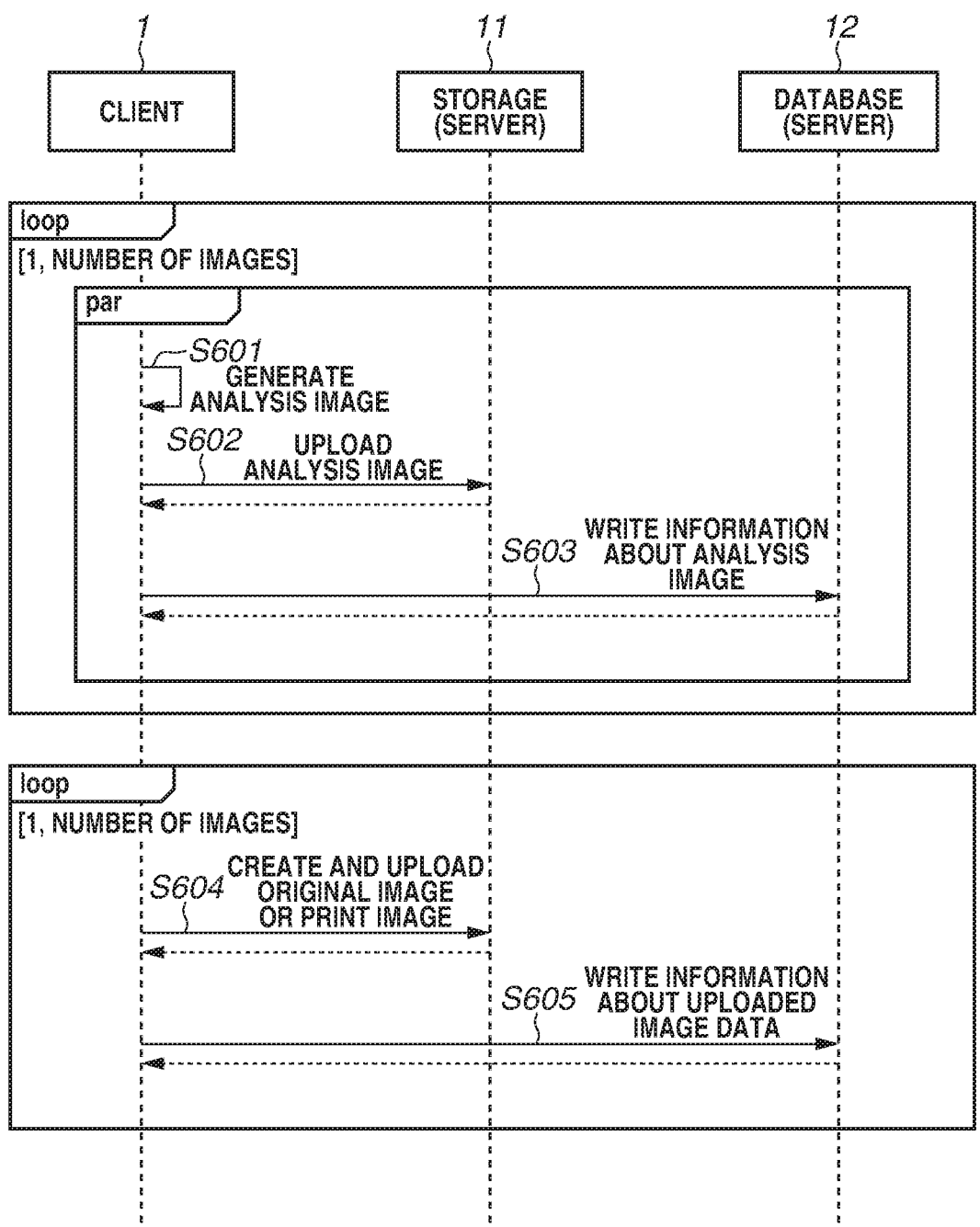

INFORMATION PROCESSING SYSTEM, INFORMATION PROCESSING APPARATUS, INFORMATION PROCESSING METHOD, AND STORAGE MEDIUM TO EXECUTE LAYOUT PROCESSING

BACKGROUND

Field of the Disclosure

The present disclosure generally relates to information processing and, more particularly, to an information processing system, an information processing apparatus, an information processing method, and a storage medium.

Description of the Related Art

A technique for creating a photo album by laying out image data corresponding to pictures captured and accumulated by a user is discussed in Japanese Patent Application Laid-Open No. 2018-124780.

Incidentally, if an apparatus that holds image data corresponding pictures is different from an apparatus that analyzes the image data, the apparatus that holds image data corresponding to pictures normally transmits the image data to the apparatus that executes analysis processing. In such a case, user-friendliness can be improved by transmitting image data efficiently.

SUMMARY

In view of the above-described issue, the present disclosure is directed to improving user-friendliness by transmitting image data efficiently.

An information processing system according to an aspect of the present disclosure includes an information processing apparatus and a server system. The information processing apparatus includes a generation unit configured to generate analysis image data based on an image selected by a user, a first transmission unit configured to transmit the analysis image data generated by the generation unit to the server system, and a second transmission unit configured to transmit, to the server system, print image data after the transmission of the analysis image data is completed, the print image data corresponding to the image selected by the user and having a data size greater than a data size of the analysis image data. The server system includes a layout unit configured to execute layout processing based on the analysis image data transmitted by the first transmission unit, a transmission unit configured to transmit a result of the layout processing performed by the layout unit to the information processing apparatus, and an instruction unit configured to issue a print instruction based on the result of the layout processing and the print image data transmitted by the second transmission unit.

Further features of the present disclosure will become apparent from the following description of exemplary embodiments with reference to the attached drawings.

BRIEF DESCRIPTION OF THE DRAWINGS

FIG. 7 is a table illustrating image analysis information used for the automatic layout processing.

FIG. 9 is a table illustrating scene classification in the automatic layout processing.

FIGS. 10A and 10B are tables each illustrating scoring of images in the automatic layout processing.

FIGS. 11A to 11I illustrate selection of images in the automatic layout processing.

FIG. 13 is a sequence diagram according to an exemplary embodiment of the present disclosure.

DESCRIPTION OF THE EMBODIMENTS

Various exemplary embodiments, features, and aspects of the present disclosure will be described in detail below with reference to the accompanying drawings. The following exemplary embodiments are not intended to limit the present disclosure described in the claims, and not all combinations of features described in the exemplary embodiments are essential for solving means of the present disclosure.

Figure 1:
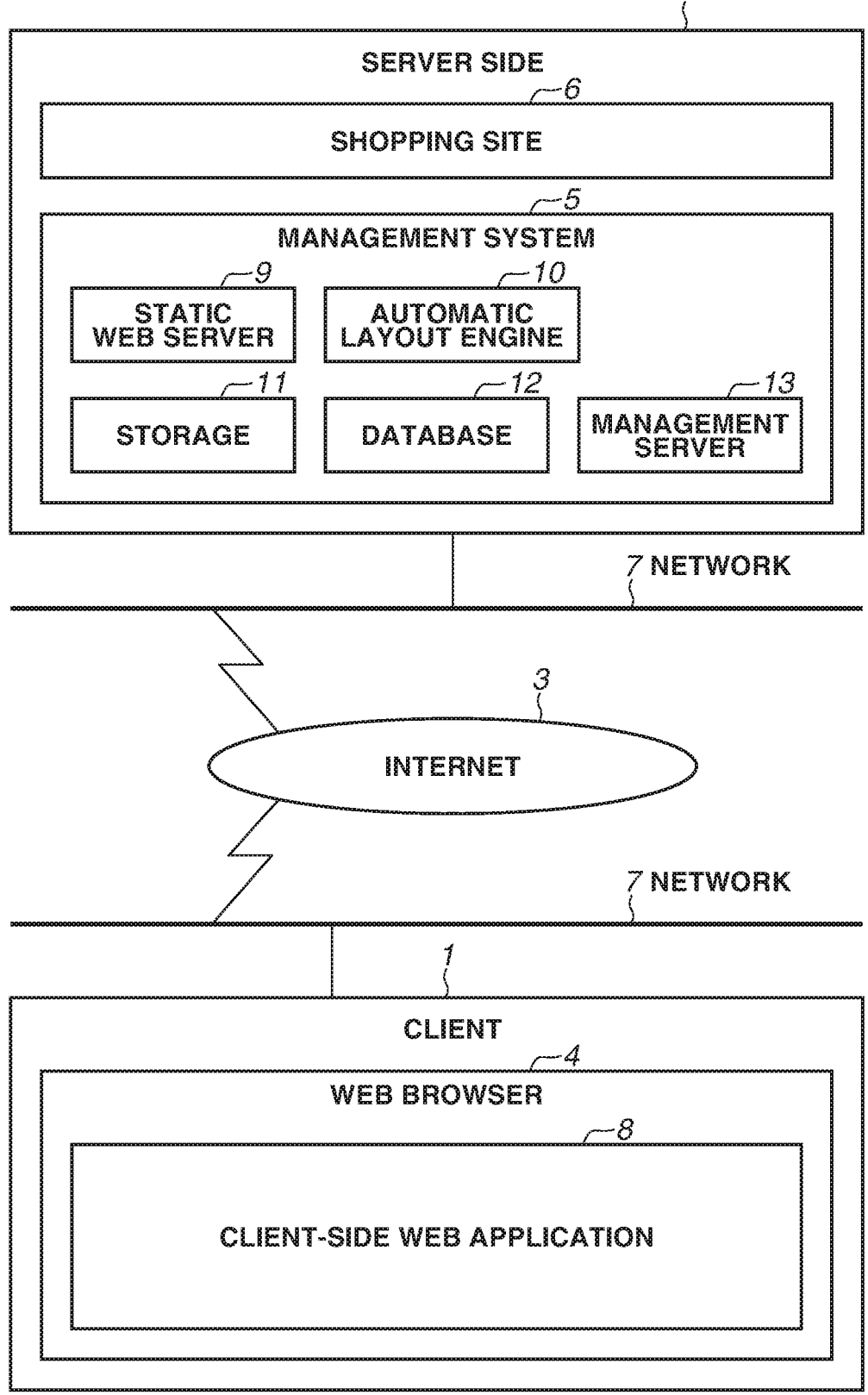
FIG. 1 is a block diagram illustrating a configuration of an information processing system.

An exemplary embodiment of the present disclosure will be described below. FIG. 1 is a block diagram illustrating an example configuration of an information processing system for creating/ordering a photo album. As illustrated in FIG. 1, the information processing system includes a client 1 and a server side 2. The client 1 and the server side 2 are connected to each other through the Internet 3 via each network 7. Examples of the client 1 include a personal computer and a smartphone. Examples of the server side 2 include a physical server and a virtual server which run on the server side 2. The server side 2 may be composed of a plurality of server groups, or may be composed of a single server. The entire server side 2 is also referred to as a server system. Examples of the network 7 include a home network for ordinary households.

The client 1 includes a web browser 4. A client-side web application 8 for creating a photo album runs on the web browser 4. The client-side web application 8 includes a HyperText Markup Language (HTML), Cascading Style Sheets (CSS), JavaScript®, or the like. The web browser 4 is used when a World Wide Web (WWW) is used.

The server side 2 includes a management system 5 and a shopping site 6. The management system 5 includes a static web server 9, an automatic layout engine 10, storage 11, a database 12, and a management server 13. The management system 5 may include a single server or a plurality of server groups. Accordingly, the management system 5 is also referred to simply as a server system (or a layout system).

The static web server 9 holds data, such as HTML, CSS, and JavaScript®, which constitutes the client-side web application 8. The web browser 4 acquires these pieces of data and the client-side web application 8 runs on the web browser 4.

The shopping site 6 is used when a user orders a photo album and, for example, the user makes a payment for the created photo album.

The automatic layout engine 10 is a physical server or a virtual server on which a program for implementing a photo album automatic layout function is installed, or is a program that runs on containers serving as an application execution environment for the server.

The storage 11 is, for example, a storage service provided by a public cloud or the like, or a storage held in a physical server or a virtual server. The storage 11 is used to store data, such as images selected by the user on the web browser 4.

The database 12 is, for example, a database service provided by a public cloud, or a database held in a physical server or a virtual server. The database 12 holds information about images uploaded to the storage 11, an image analysis result and a layout processing result obtained by the automatic layout engine 10, and the like.

The management server 13 generates data on the photo album finally ordered by the user, and transfers the data on the photo album to the shopping site 6.

Figure 2:
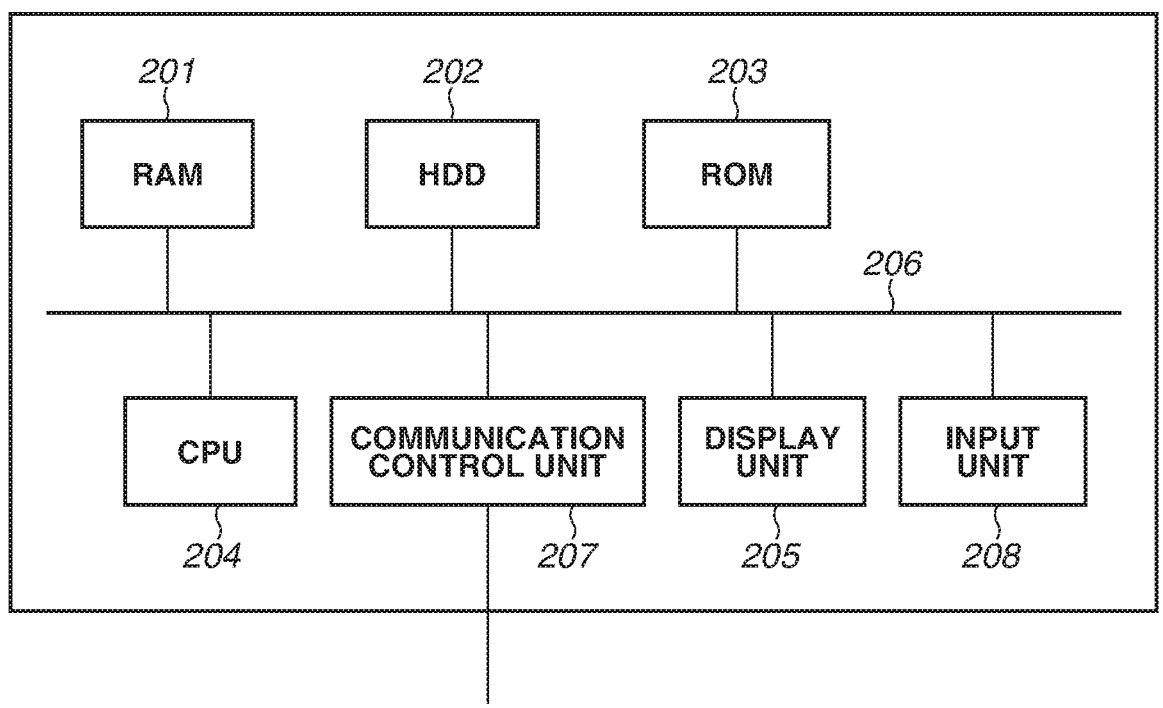
FIG. 2 is a block diagram illustrating a hardware configuration of an information processing apparatus.

FIG. 2 is a block diagram illustrating a hardware configuration example of the client 1. Assume that physical servers on the server side 2 also include a configuration similar to that of the client 1. However, the physical servers on the client 1 and the server side 2 need not necessarily include the same configuration. As illustrated in FIG. 2, the client 1 includes a central processing unit (CPU) 204, a random access memory (RAM) 201, a read-only memory (ROM) 203, a hard disk drive (HDD) 202, a display unit 205, an input unit 208, and a communication control unit 207, which are connected to each other via a system bus 206. The communication control unit 207 is also connected to the network 7. The CPU (central processing unit/processor) 204, which may include one or more processors, circuitry, or a combination thereof, may be a system control unit and may control the overall operation of the client 1. The CPU 204 may execute a display control method described in an exemplary embodiment of the present disclosure based on a program. The client 1 may include one or more memories including the RAM 201, the ROM 203, and the HDD 204. The RAM 201 is a random access memory and provides a memory for temporarily storing various information during execution of programs by the CPU 204. The ROM 203 stores programs to be executed by the CPU 204. The HDD 202 is a storage medium for storing, for example, a database for holding an image file and processing results, such as an image analysis result, and the like.

Figure 3:
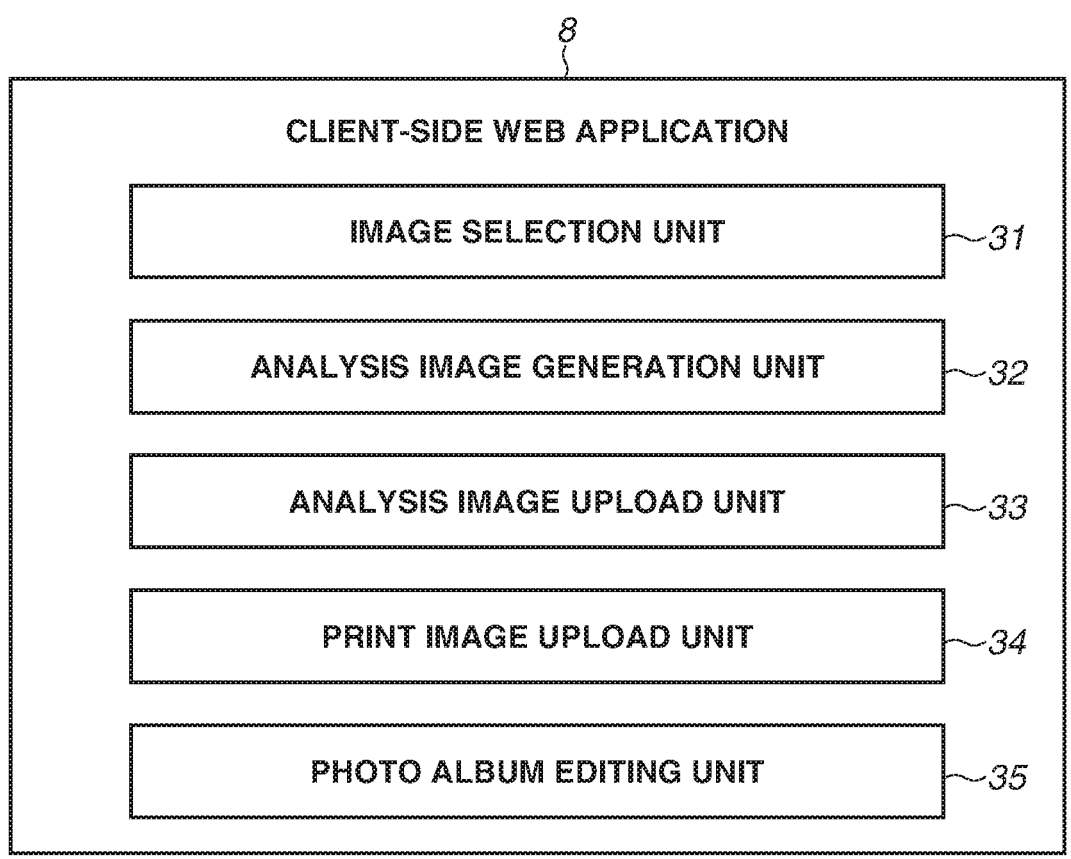
FIG. 3 illustrates a configuration of a client-side web application.

FIG. 3 illustrates a configuration of the client-side web application 8. The client-side web application 8 includes an image selection unit 31, an analysis image generation unit 32, an analysis image upload unit 33, a print image upload unit 34, and a photo album editing unit 35. When desired pictures to be arranged on a photo album are selected by the user, the image selection unit 31 selects image data corresponding to the pictures based on an instruction from the user. The analysis image generation unit 32 generates analysis image data by reducing the size of an original image to a size that can be processed by an automatic layout function. The analysis image upload unit 33 uploads the analysis image data generated by the analysis image generation unit 32 to the management system 5. The print image upload unit 34 uploads original image data corresponding to the pictures selected by the user. The print image upload unit 34 may generate print image data by reducing the size of the original image data to a size with which the print quality can be maintained, and may upload the print image data to the management system 5. The photo album editing unit 35 provides a function that enables the user to edit the photo album created by using the automatic layout function.

Figure 4:
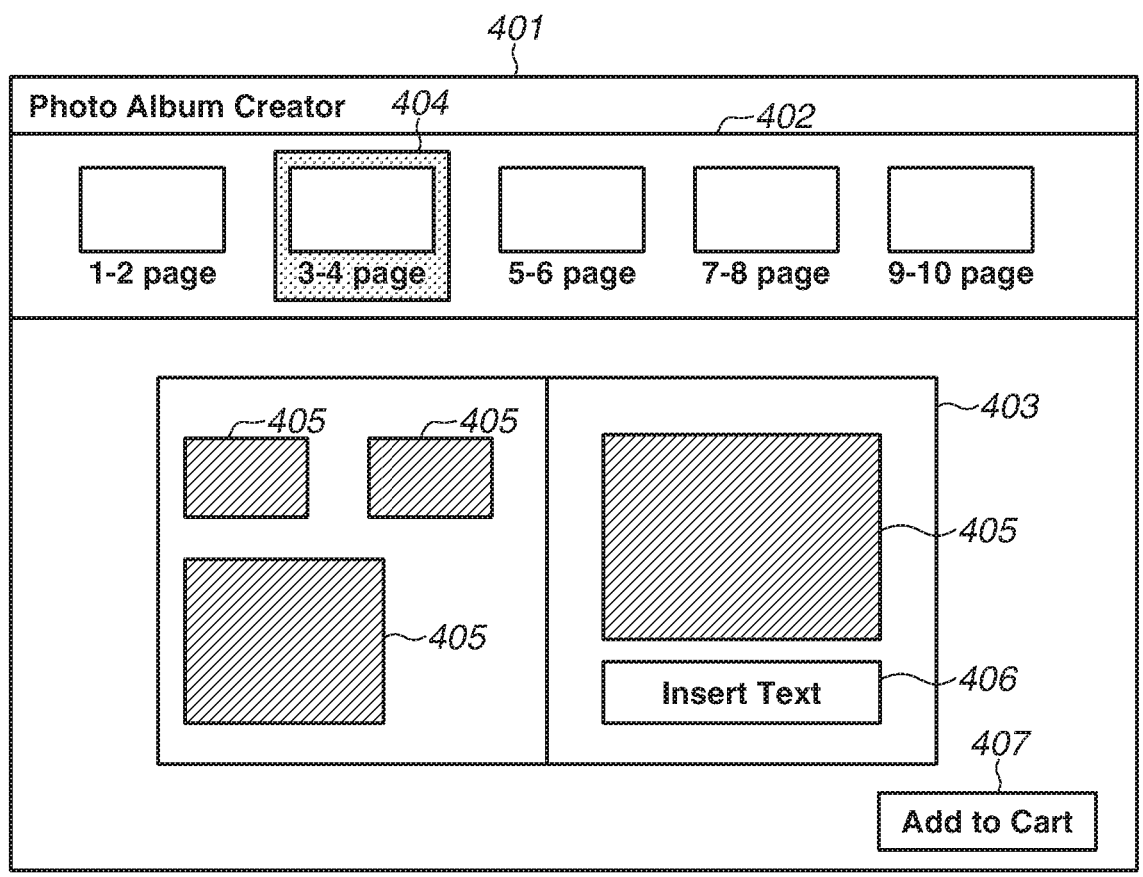
FIG. 4 illustrates a user interface.

FIG. 4 illustrates a display screen which is provided by the CPU 204 when the client-side web application 8 is executed, and which is an example of an edit screen to be used by the user to edit the photo album. An edit screen 401 is provided by the client-side web application 8. A display area 402 is an area in which a list of thumbnails of pages of the photo album is displayed. A display area 403 is an area in which a preview image of a page selected in the display area 402 is displayed, and a layout image can be edited in the display area 403.

In the display area 402, a display state 404 in which the page is selected is obtained by the user selecting a desired thumbnail from among the thumbnails of the pages. On the display screen illustrated in FIG. 4, two pages (one double-page spread), i.e., 3 to 4 pages, are selected and the layout image of the pages is displayed in the display area 403. A double-page spread corresponds to, for example, one display window in display and corresponds to a pair of pages which are printed to be adjacent to each other.

In the display area 403, an operation for editing the photo album can be performed. A template to be displayed on the layout image includes at least one slot. On the display screen illustrated in FIG. 4, the third page (left page in FIG. 4) includes three slots 405, and the fourth page (right page in FIG. 4) includes one slot 405. Image data corresponding to pictures is allocated to slots 405. In the present exemplary embodiment, the analysis image data uploaded through the above-described processing is automatically allocated to each slot 405 through processing to be described below. Any text is input to a text box 406 by the user.

A button 407 is a button used to add the photo album created (edited) with the application to a cart. Pressing of the button 407 uploads information about the layout of the edited photo album to the shopping site 6 on the server side 2 via the Internet 3.

(Configuration of Automatic Layout Processing Unit)

Figure 5:
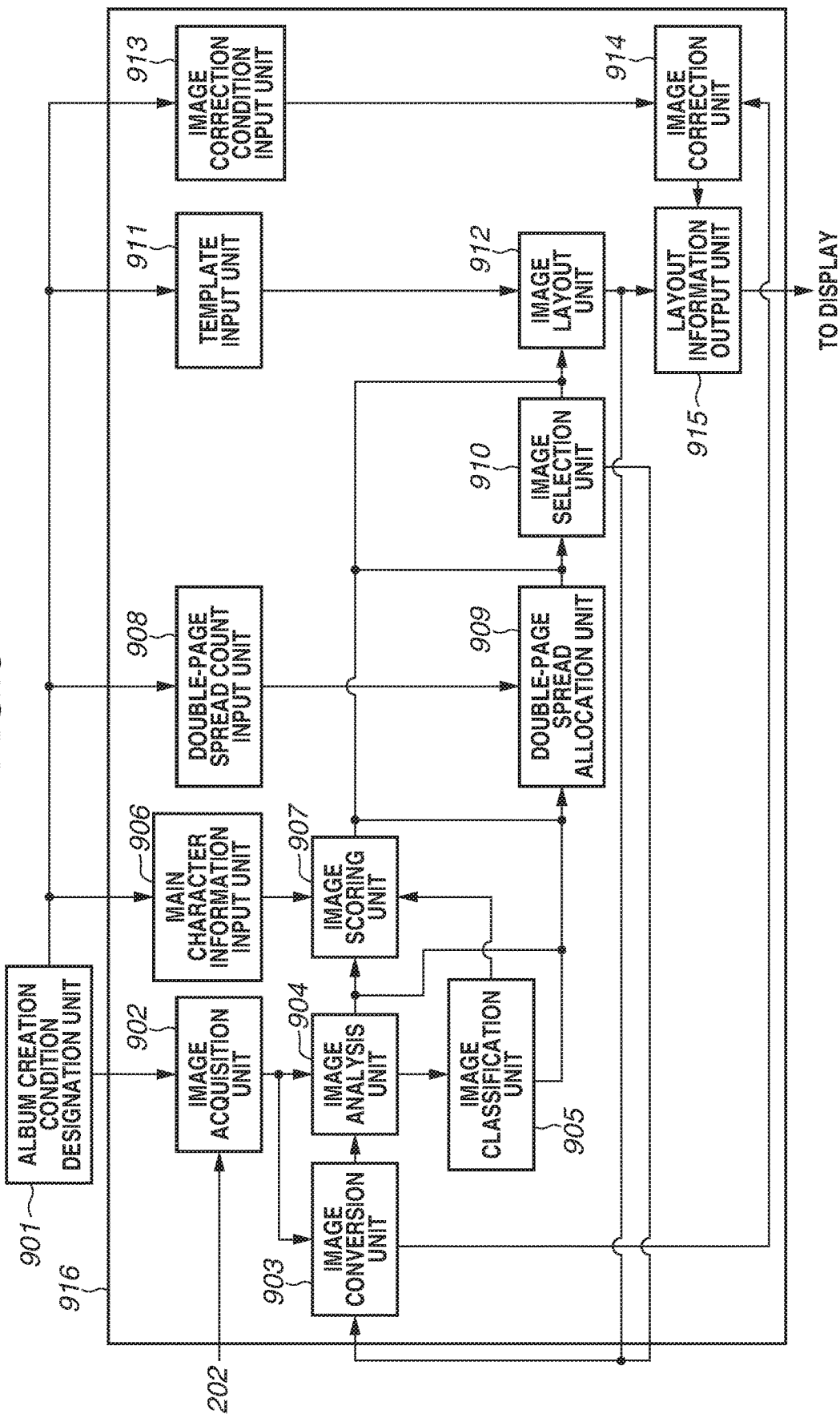
FIG. 5 is a software block diagram illustrating an automatic layout engine.

FIG. 5 is a software block diagram illustrating some of the functions of the automatic layout engine 10. The automatic layout engine 10 includes various functions. In particular, the automatic layout function provided by an automatic layout processing unit 916 will be described with reference to FIG. 5. In the automatic layout function, analysis image data is classified or selected based on the contents and attribute of the analysis image data, and the classified or selected analysis image data is laid out in each slot, thereby generating an album image to be displayed on the display unit 205.

In the present exemplary embodiment, the client-side web application 8 calls a web application programming interface (API) provided in the management system 5, thereby activating the automatic layout engine 10. As illustrated in FIG. 5, the automatic layout engine 10 includes an album creation condition designation unit 901 and the automatic layout processing unit 916. Album creation conditions are designated in the automatic layout processing unit 916 in accordance with a user interface (UI) operation through the input unit 208 such as a mouse.

An image acquisition unit 902 acquires, from the HDD 202, an image group designated by an album creation condition designation unit 901. The term "image group" used herein refers to a candidate image group to be laid out when one album is created. The image group corresponds to a group of uploaded analysis image data.

An image conversion unit 903 converts the analysis image data into a desired number of pixels and color information. In the present exemplary embodiment, the analysis image data is converted into analysis image data having the number of predetermined short-side pixels, the number of long-side pixels, and an analysis image based on sRGB color information. The number of long-side pixels is calculated from the number of short-side pixels and an aspect ratio of the analysis image data.

An image analysis unit 904 performs processing such as acquisition of a feature amount (described below) from the analysis image, face detection, expression recognition, and personal recognition. The image analysis unit 904 also performs processing for acquiring data associated with the analysis image data, such as an image capturing date and time, from an Exchangeable image file format (Exif).

An image classification unit 905 performs processing, such as scene division and scene classification (described below) on an image group by using information about the image capturing date and time, the number of captured images, and information about detected faces. The term "scene" refers to an image capturing scene, such as travel, daily life, or wedding ceremony. The scene may also be, for example, a set of images captured in an image capturing opportunity during a certain period for one image capturing target.

A main character information input unit 906 inputs identification information (ID) assigned to a main character indicated by the album creation condition designation unit 901 to an image scoring unit 907.

The image scoring unit 907 gives a score to each analysis image. In the present exemplary embodiment, a score is given in such a manner that an image suitable for the layout has a high score. In a case where a score is given in such a manner that an analysis image suitable for the layout has a high score, the information obtained by the image analysis unit 904 and the information obtained by the image classification unit 905 are used. The image scoring unit 907 gives a score to each analysis image in such a manner that the analysis image including an object corresponding to the main character ID input from the main character information input unit 906 has a high score.

A double-page spread allocation unit 909 divides an image group and allocates the divided image groups to double-page spreads. The term "double-page spread" used herein refers to a double-page spread obtained, for example, when an album is created, and corresponds to two pages.

A double-page spread count input unit 908 inputs the number of double-page spreads of the album designated by the album creation condition designation unit 901 to the double-page spread allocation unit 909.

The double-page spread allocation unit 909 divides the image group depending on the input number of double-page spreads and allocates some of the divided image groups to each double-page spread. For example, in a case where the number of double-page spreads is five, an acquired image group is divided to generate five sub-image groups, and one sub-image group is allocated to each double-page spread.

An image selection unit 910 selects images based on the score given by the image scoring unit 907 from the sub-image group allocated to each double-page spread by the double-page spread allocation unit 909.

A template input unit 911 inputs a plurality of templates corresponding to template information designated by the album creation condition designation unit 901 to an image layout unit 912.

The image layout unit 912 determines a layout of images. Specifically, the image layout unit 912 selects a template suitable for the images selected by the image selection unit 910 from among the plurality of templates input by the template input unit 911, and determines the layout (arrangement positions) of the images.

An image correction condition input unit 913 inputs, to an image correction unit 914, image correction ON/OFF conditions designated by the album creation condition designation unit 901.

The image correction unit 914 performs dodging correction, red-eye correction, and contrast correction. In a case where the image correction condition "ON" is input, the image correction unit 914 performs a correction on an image. In a case where the image correction condition "OFF" is input, the image correction unit 914 does not perform any correction. The image correction unit 914 turns on or off the correction on the image input from the image conversion unit 903. The number of pixels of the image input from the image conversion unit 903 to the image correction unit 914 can be changed with the size of the layout determined by the image layout unit 912.

A layout information output unit 915 outputs layout information to be displayed on a display based on the image layout determined by the image layout unit 912. The layout information is, for example, bitmap data in which the selected images are laid out on the selected template.

(Automatic Layout Processing Flow)

Figure 6:
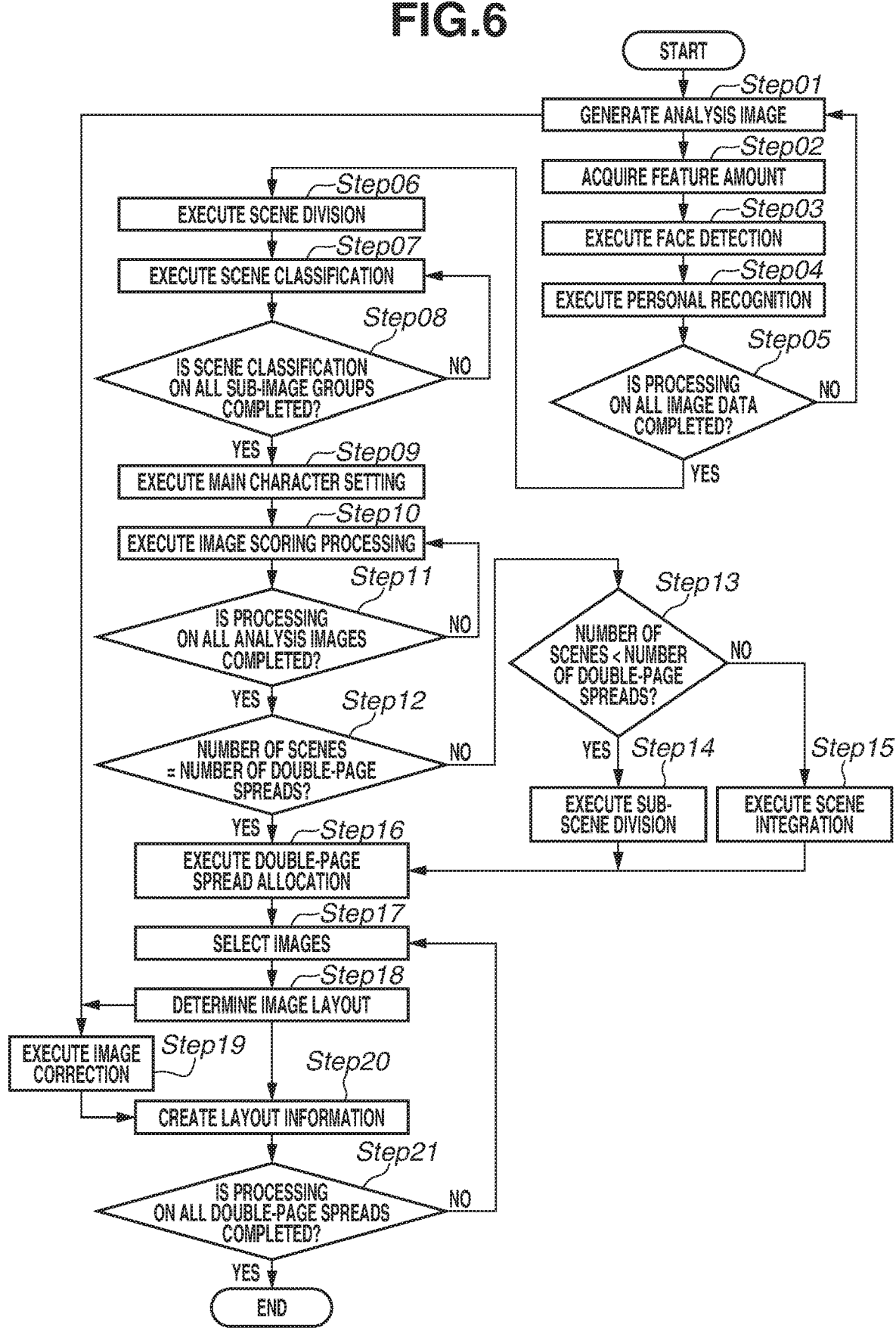
FIG. 6 is a flowchart illustrating a flow of automatic layout processing.

FIG. 6 is a flowchart illustrating processing to be executed by the automatic layout processing unit 916 according to the present exemplary embodiment. The flowchart illustrated in FIG. 6 is implemented in such a manner that, for example, the CPU 204 of the physical server on which the automatic layout engine 10 on the server side 2 is mounted reads out a program stored in the HDD 202 into the ROM 203 or the RAM 201 and executes the program.

In step S01, the CPU 204 generates an analysis image by using the analysis image generation unit 32. Since the analysis image data is uploaded from the client 1 as described above, the analysis image is generated based on the uploaded analysis image data. Specifically, the analysis image data acquired by the image acquisition unit 902 is converted into a desired number of pixels and color information. The number of pixels and color information into which the analysis image data is converted are predetermined. In the present exemplary embodiment, the analysis image data is converted into an analysis image with short-side pixels and sRGB color information.

In step S02, the CPU 204 acquires an image feature amount by using the image analysis unit 904. As the image feature amount, an image capturing date and time is acquired from data, such as Exif information, which is associated with the uploaded analysis image data. Further, information about a focus is acquired as the feature amount from the analysis image generated in step S01. A method for acquiring the information about a focus will now be described. A Sobel filter is typically known as an edge detection method. An edge can be detected by using the Sobel filter and the inclination of the edge can be calculated by dividing a brightness difference between a start point and an end point of the edge by the distance between the start point and the end point. An average inclination of edges in an image is calculated. It can be considered that an image with a large average inclination is more focused than an image with a small average inclination. A plurality of thresholds having different values is set for inclinations and an in-focus degree can be obtained by determination as to whether the inclination is greater than or equal to which one of the thresholds. In the present exemplary embodiment, two different thresholds are set and the in-focus degree is determined at three levels, i.e., "good", "average", and "not applicable". The thresholds are set through experiments with a focus inclination to be adopted for an album being set to "good", an acceptable focus inclination being set to "average", and an unacceptable inclination being se to "not applicable".

In step S03, the CPU 204 executes face detection by using the image analysis unit 904. A face object is detected from the analysis image generated in step S01. A known method can be used for face detection. For example, Adaptive Boosting (Adaboost) for creating a strong identifier from a plurality of prepared weak identifiers can be used. In the present exemplary embodiment, the CPU 204 detects a face object of a person (object) by using the strong identifier created by Adaboost. The CPU 204 detects a face object and acquires coordinate values for an upper-left position and a lower-right position of the detected face object. Specifying the two coordinates enables specification of the position of the face of the person and the size of the face. In this case, the face object of a person is detected. However, the object to be detected is not limited to the face of a person, and objects other than the face of a person may be detected. Examples of the objects other than the face of a person include animals, such as cats and dogs, flowers, foods, buildings, and ornaments.

In step S04, the CPU 204 executes personal recognition by using the image analysis unit 904. Specifically, the CPU 204 first determines a similarity between the face object extracted in step S03 and representative face objects stored by one or more personal IDs in a face dictionary database. The CPU 204 sets, as an ID for the extracted face object, an ID with a highest similarity that is greater than or equal to a threshold. In a case where the similarity is less than the threshold, the CPU 204 determines that the detected face is a new face, and registers the detected face object in the face dictionary database.

The image analysis information acquired in steps S02 to S04 is stored in such a manner that the image analysis information is distinguished for each ID with which each image is identified as illustrated in FIG. 7. As illustrated in FIG. 7, the information about the image capturing date and time and the focus determination result, which are acquired in step S02, and the information about the number and position of face objects detected in step S03 are stored. The face position information is stored in such a manner that the face position information is distinguished for each personal ID acquired in step S04. If no face object is detected in the analysis image, the information about the image capturing date and time and the focus determination result, which are acquired in step S02, are stored, and the information about the face object is not stored.

In step S05, the CPU 204 determines whether the processing of steps S01 to S04 is completed for all the uploaded analysis image data. If it is determined that the processing is not completed for all the uploaded analysis image (NO in step S05), the processing returns to step S01. If it is determined that the processing is completed for all the uploaded analysis image (YES in step S05), the processing proceeds to step S06.

Figure 8A:
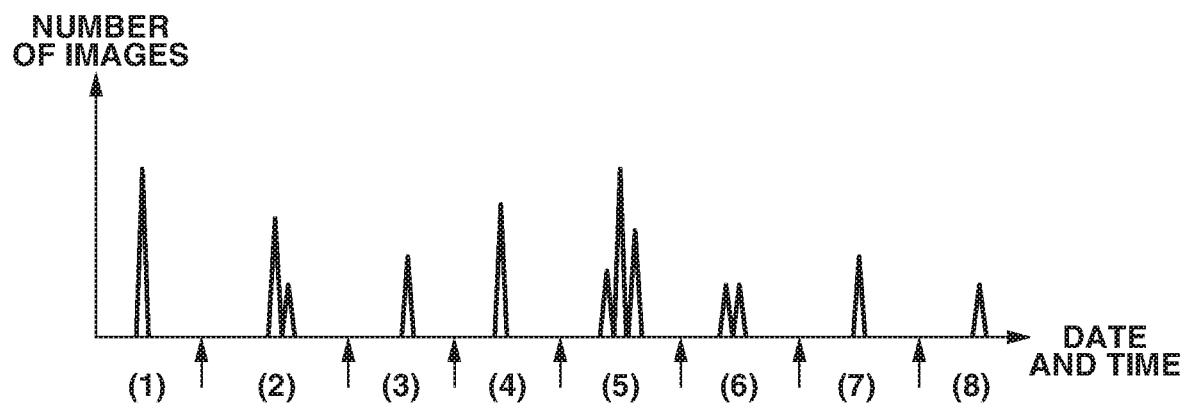
FIGS. 8A to 8C are graphs each illustrating image group division in the automatic layout processing.

In step S06, the CPU 204 executes scene division by using the image classification unit 905. The term "scene division" refers to division of an acquired image group into a plurality of sub-image groups depending on the scene. Specifically, the CPU 204 divides the image group into a plurality of sub-image groups based on a temporal difference between analysis images indicated by the information about the image capturing date and time acquired in step S02. If the image capturing date of one analysis image and the image capturing date of another analysis image are not consecutive, that is, if there is a date when no image is captured between the image capturing dates of the analysis images, the CPU 204 divides the image group before and after the date when no image is captured. Next, a case where the image capturing dates are consecutive will be described. In the present exemplary embodiment, if the difference between the image capturing times of the analysis images is 16 hours or longer, the CPU 204 divides the image group before and after the blank time of 16 hours. In a case where the difference between the image capturing times of the analysis images is less than 16 hours, if the temporal difference between a first image capturing and a last image capturing on each of the consecutive days is less than four hours, the CPU 204 divides the image group by day. If the temporal difference is greater than or equal to four hours and the number of captured images on each of the consecutive days is less than 50, the CPU 204 divides the image group by day, and if the number of captured images is greater than or equal to 50, the CPU 204 does not divide the image group. The thresholds for the temporal difference and the number of images used for the scene division are not limited to these examples. FIG. 8A illustrates a division result obtained by the scene division method described above, and illustrates that the image group is divided into eight sub-image groups.

In step S07, the CPU 204 executes scene classification by using the image classification unit 905. While the present exemplary embodiment illustrates an example in which each sub-image group is classified into three categories, i.e., "travel", "daily life", and "ceremony," the classification is not limited to this example. First, the CPU 204 acquires a sample image group classified as "travel", a sample image group classified as "daily life", and a sample image group classified as "ceremony". For each sample image group, the CPU 204 acquires the feature amount of image capturing. Examples of the feature amount acquired in the present exemplary embodiment include an image capturing period, the number of captured images, and the number of captured persons. The image capturing period corresponds to the temporal difference between the first image capturing and the last image capturing of an image group. The number of captured images is the number of images (the number of pictures) included in each sub-image group. The number of captured persons is the number of faces included in the image in which the faces are included. In other words, the number of captured persons is the number of face objects included in one image. The CPU 204 then determines an average value and standard deviation of the image capturing period, an average value and standard deviation of the number of captured images, and an average value and standard deviation of the number of persons in each image for a plurality of sample image groups. FIG. 9 illustrates the average value and standard deviation of the image capturing periods (time), the number of captured images (pieces), and the number of captured persons (persons). These determined values are preliminarily incorporated in a program of the automatic layout engine 10. After the automatic layout engine 10 is activated, the CPU 204 calculates the image capturing period, the number of captured images, and the average value of the numbers of captured images for each sub-image group generated by scene division in step S06. For each scene, scoring is performed by using the following expression (1) for the feature amounts including the image capturing period, the number of captured images, and the number of captured persons in each sub-image group, based on the average value and standard deviation thereof.

Score=50−|10×(average value−feature amount)/standard deviation (1)

Average score=(score of image capturing period+score of the number of captured images+score of the number of persons)/the number of feature amount items (2)

By using the expression (2), the average score for each of "travel", "daily life", and "ceremony" is calculated for one sub-image group. A scene with the highest score for each sub-image group is classified as the scene of the sub-image group. When two or more scenes have the same score, the scenes are classified in order of a scene priority. For example, in the present exemplary embodiment, the priority order is set in such a manner that "daily life">"ceremony">"travel". The scene "daily life" is set to the highest priority.

Assume that the image capturing period for a sub-image group (5) obtained after the scene division illustrated in FIG. 8A is 36 hours, the number of captured images is 300, and the number of captured persons is 1.7. In this case, the average score for "travel" in the sub-image group (5) is 45.32, the average score for "daily life" is 18.38, and the average score for "ceremony" is −29.92. As a result, the scene for the sub-image group (5) is classified as "travel". The classified scene is managed using a scene ID so that the scene can be identified.

In step S08, the CPU 204 determines whether the scene classification in step S07 is completed for all sub-image groups created in step S06. If the scene classification is not completed for all sub-image groups created in step S06 (NO in step S08), the processing returns to step S07. If the scene classification is completed for all sub-image groups created in step S06 (YES in step S08), the processing proceeds to step S09.

In step S09, the CPU 204 executes a main character setting by using the image scoring unit 907. The main character setting is executed on the image group designated by the user. There are two types of main character setting, i.e., an automatic main character setting and a manual main character setting. In the case of automatically setting the main character, the setting is executed based on the result of personal recognition in step S04 and the result of scene division in step S06. The CPU 204 specifies the number of times that each personal ID appears in each sub-image group, the number of times that each personal ID appears in each scene, the number of scenes in which each personal ID appears, and the like, and automatically sets the main character based on these pieces of information. In the present exemplary embodiment, the personal ID appearing in a plurality of scenes is set as the main character ID when a plurality of scenes is included in a sub-image group. When the sub-image group includes a single scene, the personal ID that appears many times in a single scene is set as the main character ID. In a case where the user designates a specific icon, the personal ID corresponding to the selected icon is transmitted to the image scoring unit 907 via the main character information input unit 906. In a case where there is a personal ID corresponding to a user designation, the automatically set main character ID described above is ignored, and the personal ID corresponding to the user designation is set as the main character ID. Such a setting based on the designation with the main character setting unit 304 in this way is referred to as an automatic setting.

In step S10, the CPU 204 executes scoring processing by using the image scoring unit 907. In the scoring processing, a score obtained by making an evaluation from perspectives (described below) is given to each analysis image. The given score is referenced during image selection in step S17 (described below).

Figure 12A:
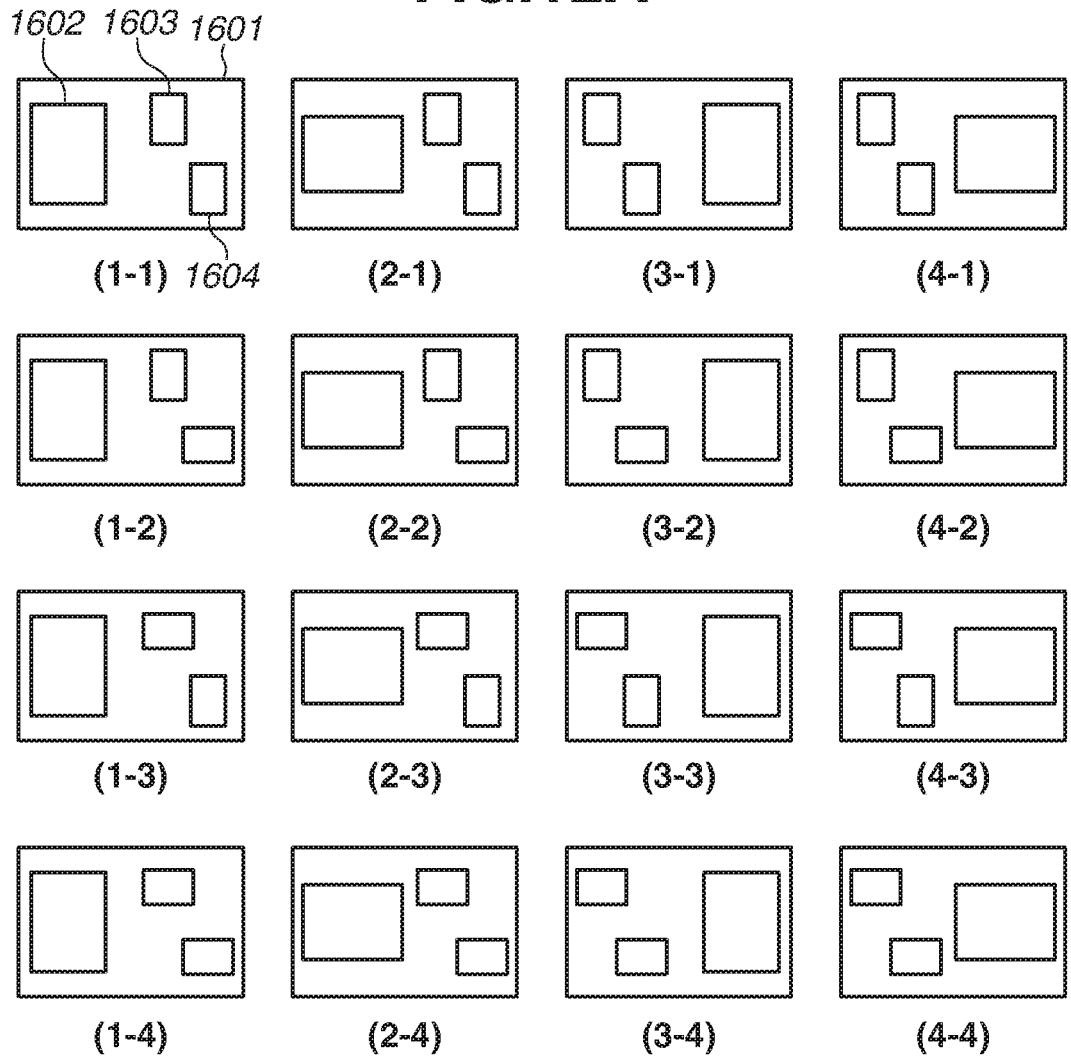
FIGS. 12A and 12B illustrate an image layout in the automatic layout processing.
Figure 12B:
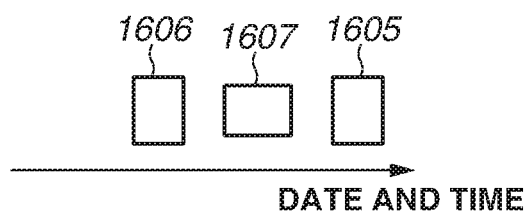

FIGS. 12A and 12B illustrate a template group that is used when three images are laid out. A template 1601 indicated by (1-1) in FIG. 12A is one template and includes a main slot 1602, a sub-slot 1603, and a sub-slot 1604. The main slot 1602 is a main slot (a frame in which an image is laid out) in the template 1601. The size of the main slot 1602 is greater than the size of each of the sub-slot 1603 and the sub-slot 1604. Each sub-slot is a slot other than the main slot in each template. A score for the main slot and a score for the sub-slot are given to each analysis image.

Next, FIG. 10A illustrates criteria for scoring. FIG. 10A is a table illustrating summaries of features of images to which a high score is given, for the respective scenes of "travel", "daily life", and "ceremony" with respect to the main slot and the sub-slot. As illustrated in FIG. 10A, features for which a high score is given vary depending on the type of a slot. For example, when the scene of the sub-image group is classified as "travel", a zoom-out image including a person and landscape obtains a high score for the main slot, and a close-up or profile image obtains a high score for the sub-slot. Scores for the other scenes are illustrated in FIG. 10A. Thus, the features for which a high score is given, in other words, evaluation criteria, vary depending on the type of a scene and a slot. In the present exemplary embodiment, it is assumed that the features for which a high score is given depending on the type of a scene and a slot are preliminarily set in the automatic layout engine 10 and are included in the program. The features for which a high score is given are not limited to the examples described above. A score is given to each analysis image included in the corresponding one of sub-image group based on the features of the main slot and the sub-slot in the corresponding scene illustrated in FIG. 10A. The CPU 204 acquires the number of face objects in each analysis image, the position of each face object in each analysis image, and the size of each face object in each analysis image. The CPU 204 calculates, for each analysis image, the average value and standard deviation for each scene and each slot type (main slot and sub-slot), and stores the calculated average value and standard deviation. The scene to which each analysis image in the image group designated by the user belongs (is classified) is specified based on a result of scene classification in step S07. The CPU 204 further calculates a score and an average score by using the following expressions (3) and (4) based on the preliminarily obtained average value and standard deviation corresponding to the scene of an analysis image of interest and the feature amounts, i.e., the number of face objects with the main character ID in the analysis image of interest, the position of each face object, and the size of each face object.

Score=50−|10×(average value−feature amount)/standard deviation (3)

Average score=(score of the number of faces+score of face position+score of face size)/the number of feature amount items (4)

The scoring processing is performed for both the main slot and the sub-slot. The score may be added to the analysis image for which the focus feature amount illustrated in FIG. 7 is determined to be "good". Thus, a high score can be given to the in-focus analysis image. FIG. 10B illustrates an example of a result of scoring for each analysis image, and scores for the main slot and the sub-slot are given to the ID of each analysis image.

In step S11, the CPU 204 determines whether the scoring processing in step S10 with the image scoring unit 907 is completed for all analysis images in the image group designated by the user. If it is determined that the processing is not completed for all analysis images in the image group designated by the user (NO in step S11), the processing returns to step S10. If it is determined that the processing is completed for all analysis images in the image group designated by the user (YES in step S11), the processing proceeds to step S12.

In step S12, the CPU 204 determines whether the number of scenes obtained through scene division performed by the image classification unit 905 (the number of sub-image groups) is identical to the number of double-page spreads input by the double-page spread count input unit 908, by using the double-page spread allocation unit 909. If it is determined that the number of scenes is not identical to the number of double-page spreads (NO in step S12), the processing proceeds to step S13. If it is determined that the number of scenes is identical to the number of double-page spreads (YES in step S12), the processing proceeds to step S16. For example, when the number of sub-image groups illustrated in FIG. 8A is eight and the number of double-page spreads input by the double-page spread count input unit 908 is eight, the processing proceeds to step S16.

In step S13, the CPU 204 determines whether the number of sub-image groups obtained through scene division performed by the image classification unit 905 is smaller than the number of double-page spreads input by the double-page spread count input unit 908, by using the double-page spread allocation unit 909. If it is determined that the number of sub-image groups is not smaller than the number of double-page spreads (NO in step S13), the processing proceeds to step S15. If it is determined that the number of sub-image groups is smaller than the number of double-page spreads (YES in step S13), the processing proceeds to step S14. For example, when the number of sub-image groups illustrated in FIG. 8A is eight and the number of double-page spreads input by the double-page spread count input unit 908 is 10, the number of sub-image groups is smaller than the number of double-page spreads. Accordingly, the processing proceeds to step S14.

Figure 8B:
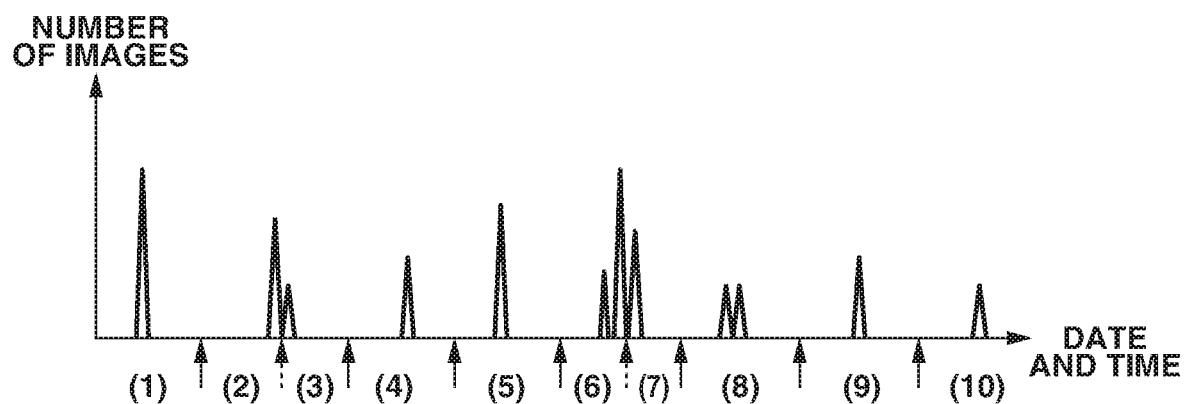

In step S14, the CPU 204 executes sub-scene division by using the double-page spread allocation unit 909. The term "sub-scene division" refers to further dividing of a sub-image group obtained after the division in a case where the number of divided scenes is smaller than the number of double-page spreads holds. An example will be described in which the number of sub-image groups illustrated in FIG. 8A is eight while the number of designated double-page spreads is 10. FIG. 8B illustrates a result obtained after sub-scene division is performed on the division result illustrated in FIG. 8A. The sub-image groups are further divided at points indicated by a dashed-line arrow, thereby increasing the number of sub-image groups to 10. The sub-scene division is performed based on the number of images and the image capturing date and time. The CPU 204 specifies the sub-image group with a large number of images among the sub-image groups illustrated in FIG. 8A. In this example, the number of scenes is to be increased from eight to 10. Accordingly, two sub-image groups with a large number of images are specified. The sub-image group (5) and sub-image groups (1) and (2) are specified in a descending order as the two sub-image groups.

In the present exemplary embodiment, if the number of images in each sub-image group is the same, the sub-image group with a larger temporal difference between a first image and a last image included in the sub-image group is divided. The sub-image group (1) and the sub-image group (2) include the same number of images. However, since the temporal difference between the first image and the last image in the sub-image group (2) is greater than that in the sub-image group (1), the sub-image group (2) is set as a division target. Specifically, in FIG. 8B, the sub-image group (5) and the sub-image group (2) are further divided.

First, a method for dividing the sub-image group (2) illustrated in FIG. 8A will be described. The sub-image group (2) has two peaks for the number of images. These two peaks are obtained on different image capturing dates. In this case, the sub-image group is divided at a point (point indicated by a dashed-line arrow illustrated in FIG. 8B) where the image capturing date changes.

Next, a method for dividing the sub-image group (5) illustrated in FIG. 8A will be described. The sub-image group (5) has three peaks for the number of images. The three peaks are obtained on different image capturing dates. Also, in this case, the sub-image group is divided at a point where the image capturing date changes. In this case, there are two points where the image capturing date changes, and the sub-image group is divided in such a manner that the difference between the numbers of images in image groups to be obtained through division decreases. For the sub-image group (5) illustrated in FIG. 8A, the difference in number of images between the sub-image groups obtained by dividing the sub-image group (5) illustrated in FIG. 8A at a boundary between the second day and the third day is smaller than the difference in number of images between the sub-image groups obtained by dividing the sub-image group (5) illustrated in FIG. 8A at a boundary between the first day and the second day. Accordingly, the sub-image group (5) illustrated in FIG. 8A is divided at the boundary between the second day and the third day. That is, the sub-image group (5) is divided at the point indicated by a dashed-line arrow illustrated in FIG. 8B. In this way, the number of image groups to be divided is increased from eight to 10. In this case, the image group is divided at a boundary between different image capturing dates. However, if a sub-image group with a large number of images is captured on a single day, the sub-image group is divided at a point corresponding to a largest temporal difference in a single day.

Figure 8C:
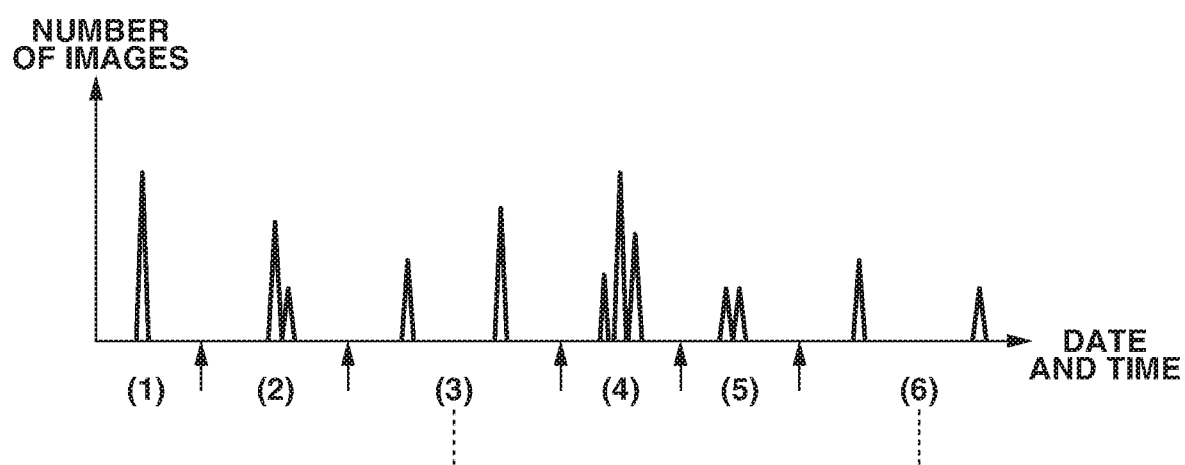

In step S15, the CPU 204 uses the double-page spread allocation unit 909 to execute scene integration. The term "scene integration" refers to integration of divided scenes (sub-image groups) in a case where the number of scenes is greater than the number of double-page spreads. Specifically, the scene integration is performed in such a manner that the number of sub-image groups matches the number of double-page spreads. FIG. 8C illustrates a result obtained by performing scene integration on the division result illustrated in FIG. 8A and reducing the number of sub-image groups to six when the number of double-page spreads is six. The sub-image groups are integrated at points each indicated by a dashed line, or the sub-image groups are not divided at the points each indicated by a dashed line, so that the number of scenes (the number of sub-image groups) is reduced to six. In the scene integration, a sub-image group with a small number of images is specified. In this example, the number of sub-image groups to be divided is to be reduced by two, i.e., reduced from eight to six. Accordingly, sub-image groups with a small number of images are specified.

In FIG. 8A, a sub-image group (8), a sub-image group (3), and a sub-image group (7) are treated in an ascending order as the sub-image groups with a small number of images. Accordingly, the CPU 204 first sets the sub-image group (8) as an integration target. Next, the number of images in the sub-image group (3) is the same as the number of images in the sub-image group (7). However, since the sub-image group (8) adjacent to the sub-image group (7) is the integration target, the sub-image group (3) is set as the integration target here. Next, the CPU 204 determines whether the sub-image group to be integrated is integrated with the sub-image group with an earlier image capturing date and time, or with the sub-image group with a later image capturing date and time. First, the integration of the sub-image group (3) will be described. The CPU 204 compares the temporal difference between the sub-image group (2) and the sub-image group (4), which are before and after the sub-image group (3), illustrated in FIG. 8A. As a result, the difference between the image capturing time of the last analysis image of the sub-image group (3) and the image capturing time of the first analysis image of the sub-image group (4) is smaller than the difference between the image capturing time of the first analysis image of the sub-image group (3) and the image capturing time of the last analysis image of the sub-image group (2). Thus, it is determined that the sub-image group (3) illustrated in FIG. 8A is to be integrated with the sub-image group (4). Specifically, sub-image group (3) illustrated in FIG. 8A is integrated at a point indicated by a dashed line in FIG. 8C. Next, the integration of the sub-image group (8) will be described. The sub-image group (8) illustrated in FIG. 8A is integrated with the previous sub-image group (7) because there is no sub-image group subsequent to the sub-image group (8). Specifically, the sub-image group (8) illustrated in FIG. 8A is integrated at a point indicated by a dashed line in FIG. 8C. In the present exemplary embodiment, sub-image groups having a small difference in image capturing time therebetween are integrated. However, the sub-image groups to be integrated are not limited to these examples. For example, the sub-image group to be integrated may be integrated with a sub-image group with a small number of captured images.

In step S16, the CPU 204 executes double-page spread allocation by using the double-page spread allocation unit 909. Through steps S12 to S15, the number of sub-image groups becomes the same as the number of designated double-page spreads. In the present exemplary embodiment, the CPU 204 allocates the sub-image groups to the double-page spreads in the order of the image capturing date and time. Specifically, the CPU 204 allocates the sub-image group with the earliest image capturing date and time to the first double-page spread, and allocates the sub-image group with the second earliest image capturing date and time to the second double-page spread. That is, the sub-image groups are allocated to the pages of each double-page spread of the album in the order of the image capturing date and time. Thus, the album in which the sub-image groups are arranged in the order of the image capturing date and time can be created. As described below, analysis images need not necessarily be arranged in the order of the image capturing date and time in a single double-page spread.

In step S17, the CPU 204 selects a predetermined number of analysis images from each sub-image group by using the image selection unit 910. An example in which four analysis images are selected from the sub-image group allocated to a certain double-page spread will be described with reference to FIGS. 11A to 11I. The term "double-page spread" used herein refers to two pages. Each of the first double-page spread and the last double-page spread is one page. FIG. 11A illustrates a temporal difference between the image capturing date and time of the first analysis image included in the sub-image group allocated to a double-page spread and the image capturing date and time of the last analysis image included in the sub-image group, that is, the image capturing period of the sub-image group. A method in which the CPU 204 selects the first analysis image will be described with reference to FIG. 11B. A template includes a single main slot 1002. The CPU 204 selects an analysis image for the main slot as a first analysis image. The CPU 204 selects an analysis image with the highest score for the main slot given in step S10 from among all the analysis images captured during the image capturing period of the sub-image group illustrated in FIG. 11B. The CPU 204 then selects analysis images for sub-slots as the second and subsequent analysis images. In the present exemplary embodiment, the image capturing period of the sub-image group is divided into smaller periods and an image is selected, so that the image capturing period of each analysis image used for creating the album can be deconcentrated. First, as illustrated in FIG. 11C, the CPU 204 divides the image capturing period of the sub-image group into two image capturing periods. In other words, a sub-division image capturing period is divided into two image capturing periods (divided into groups). Next, the CPU 204 selects, as the second analysis image, an image with the highest score for the sub-slot from the image capturing period in which the first image is not selected (section indicated by a solid line) as illustrated in FIG. 11D. Next, as illustrated in FIG. 11E, the CPU 204 divides each image capturing period illustrated in FIG. 11D into equal halves. The CPU 204 then selects, as a third analysis image, an analysis image with the highest score for the sub-slot from among the analysis images captured during an section indicated by a solid line in FIG. 11F (images corresponding to two image capturing periods), that is, during two image capturing periods in which the first and second analysis images are not selected. Next, an example in which there is no image in the image capturing period from which an image is to be selected and thus the image selection cannot be performed will be described taking an example of selecting a fourth analysis image. In the present exemplary embodiment, the image capturing period is divided depending on time, regardless of the number of images. Accordingly, some of the divided image capturing periods may include no image. For example, assume that, as illustrated in FIG. 11G, the CPU 204 is to select four images from the image capturing period in which no image has been selected (section indicated by oblique lines), but assume that there is no image in the section indicated by oblique lines. In such case, as illustrated in FIG. 11H, the CPU 204 divides each image capturing period from which images have been selected into two periods. Next, as illustrated in FIG. 11I, the CPU 204 selects, as a fourth analysis image, an analysis image with the highest score for the sub-slot from among the analysis images captured during the image capturing periods which are indicated by a solid line and from which the first to third analysis images have not been selected.

In step S18, the CPU 204 determines an image layout for the double-page spreads to be processed by using the image layout unit 912. A description will be provided of such a determination process taking an example in which the template input unit 911 inputs templates (1-1) to (4-4) illustrated in FIG. 12A to a certain double-page spread based on designated template information. The number of slots in each of the input templates is three. FIG. 12B illustrates a result indicating the orientation, portrait or landscape, of the three images selected in step S17, where the three images are arranged in the order of the image capturing date and time. In this example, an image 1605 is selected as an analysis image for the main slot, and images 1606 and 1607 are selected as analysis images for the sub-slots. In the present exemplary embodiment, an image with an earlier image capturing date and time is arranged at an upper left position on templates, and an image with a later image capturing date and time is arranged at a lower right position on the templates. The image 1605 is a portrait image and an image which has the latest image capturing date and time and is used for the main slot. Accordingly, templates (3-1) to (3-4) illustrated in FIG. 12A are set as candidate templates. The image for the sub-slot with the earlier image capturing date and time, i.e., the image 1606, is a portrait image to be arranged at the upper left position, and the image with the later image capturing date and time, i.e., the image 1607, is a landscape image. Accordingly, it is determined that the template (3-2) is to be an optimum template for the selected analysis images. Further, analysis images to be arranged in the slots of the determined template are determined. In this way, in step S18, information which enables specification of the template to be used for layout and enables specification of which images and in which slot of the template are to be laid out. In the above-described example with reference to FIGS. 12A and 12B, the number of slots is three. However, if the desired number of images is four in step S17, a template set including four slots is prepared and a matching degree between a slot state and an image state is determined for the template set.

In step S19, the CPU 204 executes image correction by using the image correction unit 914. If the image correction condition input unit 913 inputs "ON", the image correction is performed. In the present exemplary embodiment, dodging correction, red-eye correction, and contrast correction are automatically performed as the image correction. If the image correction condition input unit 913 inputs "OFF", the image correction is not performed. The number of pixels in a short side of the image to be corrected is 1200 pixels, and the image correction on the image converted into an sRGB color space is turned ON or OFF.

In step S20, the CPU 204 creates layout information by using the layout information output unit 915. The CPU 204 lays out analysis images in the manner determined in step S18. In this case, the analysis images to be laid out based on size information about each slot included in the template are magnified and laid out. Bitmap data in which the analysis images are laid out in each slot of the template is generated.

In step S21, it is determined whether the processing of steps S17 to S20 is completed for all double-page spreads. If the processing is not completed for all double-page spreads (NO in step S21), the processing returns to step S17. If the processing is completed for all double-page spreads (YES in step S21), the automatic layout processing ends.

The result of the processing described above is transmitted from the management system 5 to the client-side web application 8, thereby displaying the screen illustrated in FIG. 4 on the client side.

(Overall Sequence of the Present Disclosure)

Figure 14:
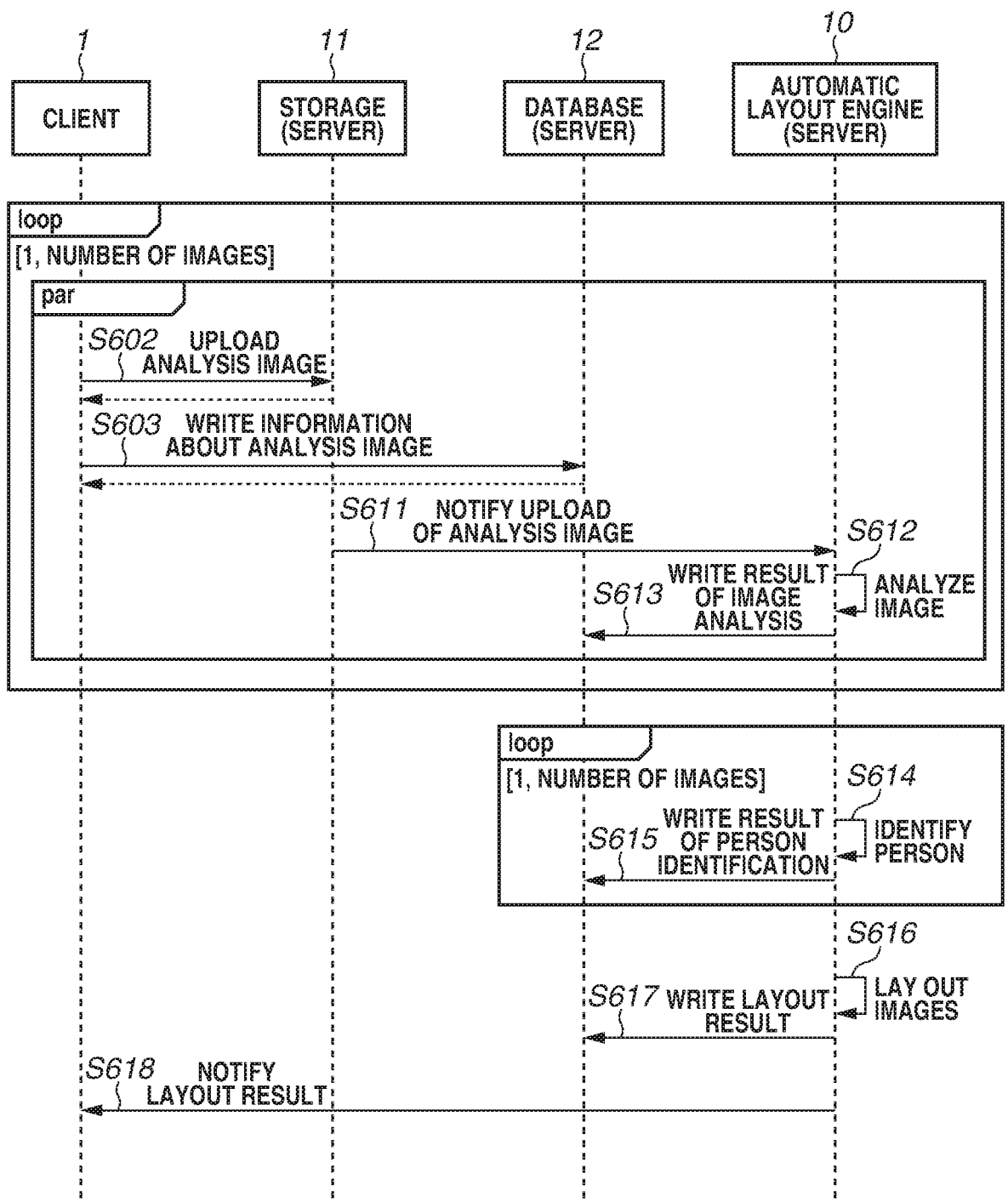
FIG. 14 is a sequence diagram according to an exemplary embodiment of the present disclosure.

FIGS. 13 and 14 each illustrate an example in which original image data corresponding to pictures designated by the user is uploaded after all analysis image data obtained by reducing the size of the original image data is uploaded. FIGS. 13 and 14 are sequence diagrams each illustrating data exchange among the client 1, the storage 11, the database 12, and the automatic layout engine 10. The client 1 is, for example, the client-side web application 8. However, the client 1 according to the present disclosure is not limited to this example. A native application that runs on a personal computer or a smartphone may also be used. The storage 11 is constructed on the server. The database 12 is storage constructed on the server. The automatic layout engine 10 is obtained by the automatic layout function being implemented on the server.

In step S601, the client 1 reduces the size of the original image data corresponding to pictures selected by the user to generate analysis image data. The size of the analysis image data is, for example, a size that can be processed by the automatic layout engine 10.

In step S602, the client 1 uploads the analysis image data generated in step S601 to the storage 11.

In step S603, the client 1 writes information about the analysis image data generated in step S601 into the database 12. Examples of the information to be written into the database 12 include an ID for identifying the analysis image data, and status information about the analysis image data. The value of the ID for identifying analysis image data is, for example, a hash value using analysis image data as an input value. This hash value is calculated by, for example, a hash function such as Message Digest Algorithm 5 (MD5). Writing the hash value of the analysis image data as the ID into the database 12 in this way enables control uploading so as to prevent the image data identical to the uploaded analysis image data from being uploaded again. For example, in the case of uploading the analysis image data in step S602, the client 1 acquires information from the database 12. The client 1 then checks whether the data having the hash value identical to that of the analysis image data to be uploaded has been uploaded. If the data has been uploaded, the client 1 performs control so as to prevent the data from being uploaded again. Values that can be taken by the status information about each analysis image may indicate that "analysis image has been uploaded" and "image analysis on the analysis image has been performed". In this case, only uploading of the analysis image is performed and the image analysis has not been performed. Accordingly, the image status indicates "analysis image has been uploaded". The status information to be written into the database 12 by the client 1 indicates "analysis image has been uploaded". On the other hand, the automatic layout engine 10 writes information indicating "image analysis on the analysis image has been performed".

In step S604, the client 1 uploads the original image data (or print image data) about pictures selected by the user to the storage 11. The term "print image data" used herein refers to image data obtained in such a manner that the client 1 reduces the size of the original image to a size with which the print quality can be maintained. Assume that, the resolution at which the print quality in a print apparatus that prints a photo album is maintained is 100 dpi and a maximum size of each picture slot included in the template for the photo album is 10 inches long (in the vertical direction) and 10 inches wide (in the horizontal direction). In such a case, if the image data includes 1000 pixels (100 dpi×10 inches) or more long and 1000 pixels (100 dpi×10 inches) or more wide, the print quality can be maintained. Accordingly, in this example, the size of the original image data corresponding to the pictures selected by the user is reduced to a size of 1000 pixels or more long and 1000 pixels or more wide, thereby obtaining the print image data. When the pieces of image data are arranged in a descending order of data size, the original image data is the largest, the print image data is the second largest, and the analysis image data is the smallest. For ease of explanation, the following description will be provided assuming that the print image data is uploaded after the analysis image data is uploaded. However, the original image data may be uploaded in the order illustrated in the drawings.

In step S605, the client 1 writes information about the print image data uploaded in step S604 into the database 12. Examples of the information include an ID for identifying the print image data, and status information about the print image data. The value of the ID for identifying the print image data is, for example, a hash value with the print image data corresponding to the pictures selected by the user as an input value, which is basically similar to that described above with regard to the analysis image data. Thus, the advantageous effect of writing the hash value of the print image as the ID into the database 12 is also similar to that described above with regard to the analysis image data. Values that can be taken by the status information about the print image data may indicate "print image has been uploaded".

FIG. 13 illustrates that steps S604 to S605 are executed after the processing of steps S601 to S603 is performed on all analysis image data. The processing in this order enables the client 1 to promptly upload the analysis image data to be used for the layout processing described above with reference to FIG. 6 to the management system 5. In particular, uploading of the print image data is not performed during transmission of the analysis image data, which prevents a load on the network in steps S601 to S603 from increasing and thus enables prompt uploading of the analysis image data.

As illustrated in FIG. 13, if the print image data is uploaded to the management system 5 after uploading of all analysis image data is completed, the automatic layout engine 10 can start analysis processing or layout processing before uploading of the print image data is completed. Accordingly, the user can promptly check an automatic layout result (e.g., FIG. 4). The user who has checked the automatic layout result starts an editing operation based on the result. During the editing operation, the processing of uploading the original image or print image is also asynchronously processed in the background. The asynchronous processing in the background prevents adverse effects such as difficulty in the operation of editing a photo album due to the processing of uploading the original image or print image.

FIG. 14 is a sequence diagram mainly illustrating processing to be performed on the management system 5 after the analysis image data is uploaded to the management system 5. Steps S602 and S603 have been described above with reference to FIG. 13, and thus the descriptions thereof are omitted.

In step S611, the storage 11 notifies the automatic layout engine 10 of completion of uploading of the analysis image data. If information indicating "analysis image has been uploaded" is written, the storage 11 performs step S611. In the example illustrated in FIG. 14, the storage 11 notifies the automatic layout engine 10 of the completion. However, the present disclosure is not limited to this example. The automatic layout engine 10 may perform polling for the storage 11 and the database 12, and the automatic layout engine 10 may detect uploading of the analysis image data.

In step S612, the automatic layout engine 10 analyzes images by using the analysis image based on the analysis image data. The image analysis is started when the notification indicating that uploading of the analysis image data in step S611 is completed is received. In the image analysis, processing, such as scoring of images as described above with reference to FIG. 6, and detection of persons in an image, is performed.

In step S613, the automatic layout engine 10 writes information about a result of the image analysis performed in step S612 into the database 12. Examples of information about the image analysis result include the score calculated through image analysis and detected personal information.

In step S614, the automatic layout engine 10 identifies each person based on the person detection result obtained by the image analysis in step S612. Specifically, it is determined which person is included in each analysis image based on the result of detecting persons in a plurality of analysis images, and person identifying processing, such as processing of determining a person who appears many times to be a main character, is performed. This sequence diagram illustrates an example in which the person detection is performed after all the images are analyzed. However, the present disclosure is not limited to this example. The person detection may be sequentially performed on the images in the order from the image on which the image analysis is completed first.

In step S615, the automatic layout engine 10 writes the result of person identification performed in step S614 into the database 12. For example, information about the person set as the main character is written.

In step S616, the automatic layout engine 10 lays out images on templates for the photo album based on the result of image analysis performed in step S612 and the result of person identification performed in step S614.

In step S617, the automatic layout engine 10 writes the result of the photo album layout processing performed in step S616 into the database 12. For example, information about adopted templates and information about images adopted for image slots of the templates are written into the database 12.

In step S618, the automatic layout engine 10 notifies the client 1 of the photo album layout processing result. In response to receiving this notification, the client 1 acquires the layout processing result from the database 12. This configuration enables the layout processing result obtained by the automatic layout engine 10 to be presented to the user. For example, the screen illustrated in FIG. 4 is presented to the user. The user performs the photo album editing operation on this screen.

Figure 15:
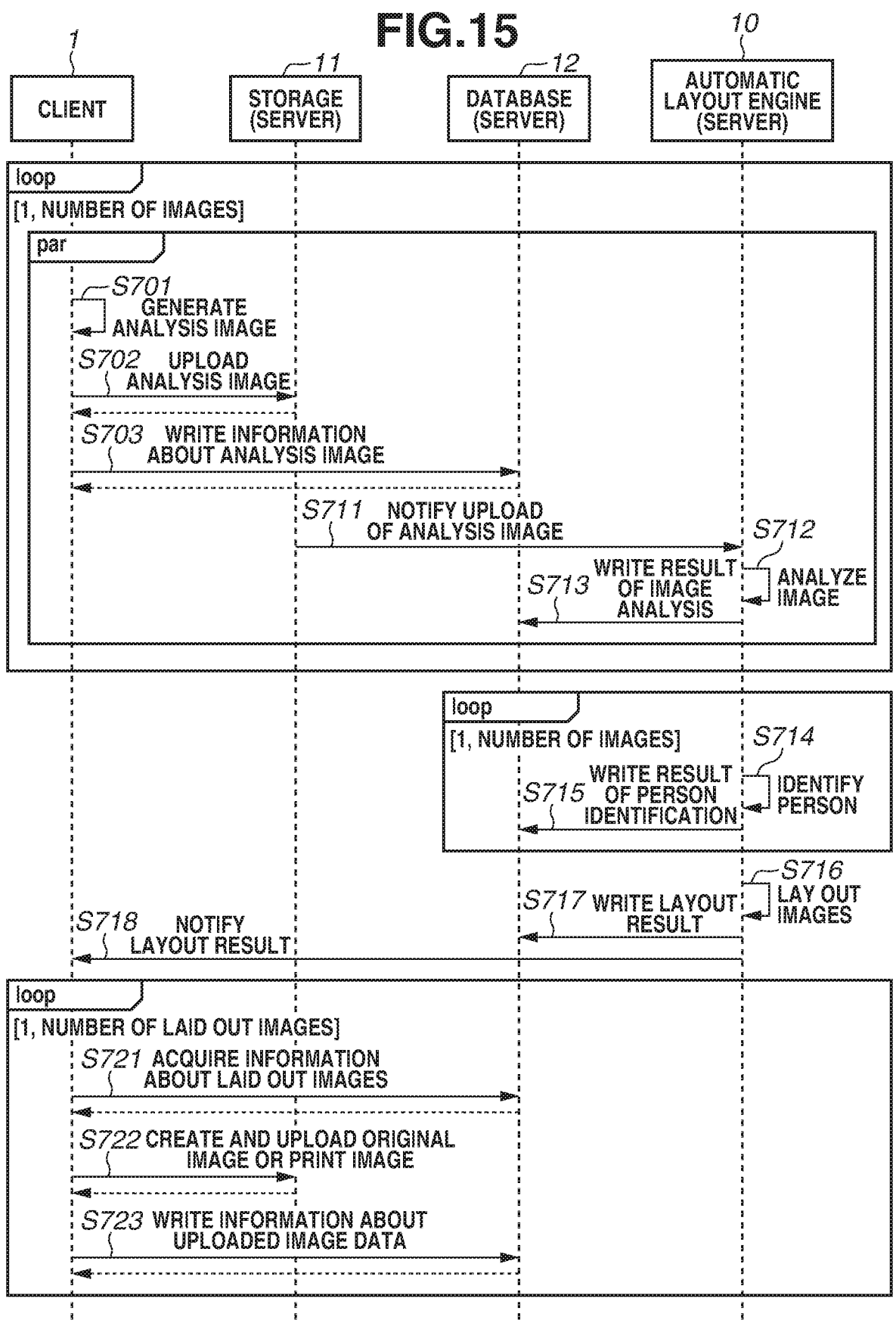
FIG. 15 is a sequence diagram according to an exemplary embodiment of the present disclosure.
Figure 16:
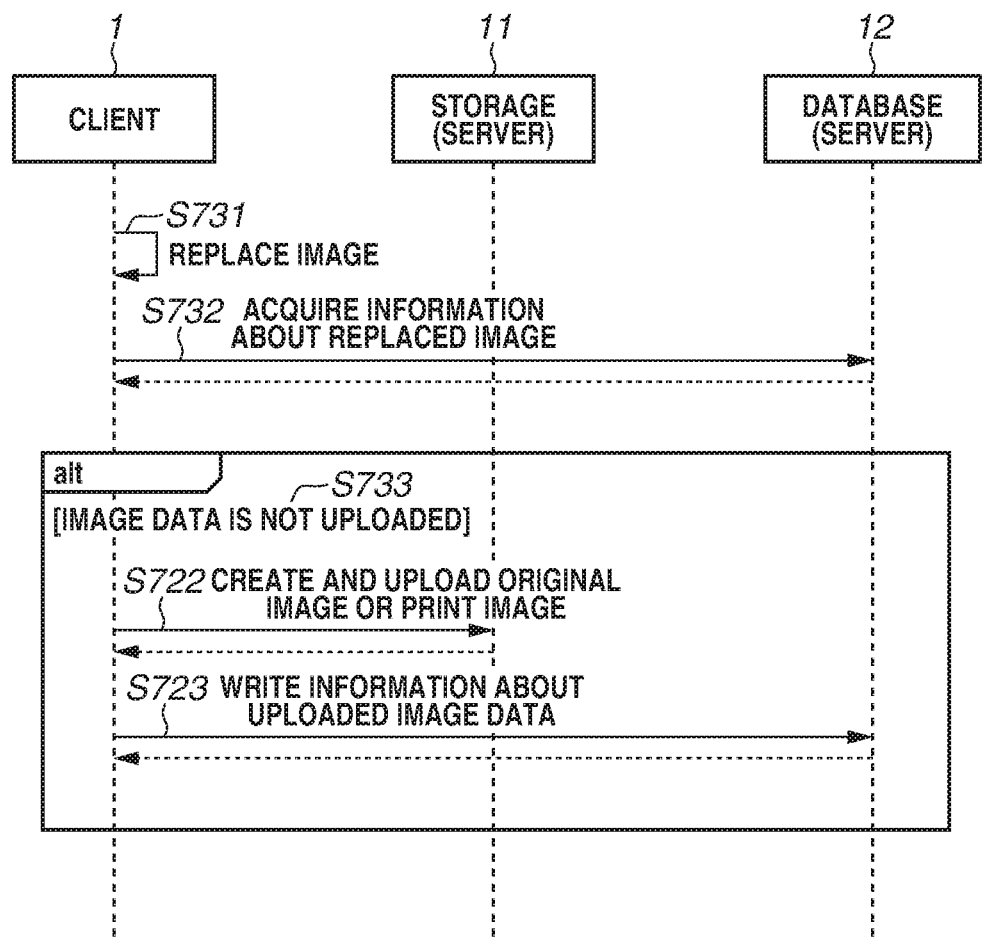
FIG. 16 is a sequence diagram according to an exemplary embodiment of the present disclosure.

FIGS. 15 and 16 each illustrate an example in which only the print image data corresponding to the laid out analysis images is uploaded instead of uploading the print image data corresponding to all the pictures selected by the user as illustrated in FIGS. 13 and 14.

FIG. 15 will now be described. Steps S701 to S703 and steps S711 to S718 are similar to steps S601 to S603 and steps S611 to S618, respectively, and thus the descriptions thereof are omitted.

In step S721, the client 1 refers to the information in the database 12 and acquires information about the laid out analysis images. As a result, the client 1 can specify which pictures are adopted for the photo album by using the automatic layout engine 10 among the pictures selected by the user.

In step S722, the client 1 creates the print image data from the original image data on pictures corresponding to the analysis images laid out in the storage 11, and uploads the created print image data. The print image data corresponds to the print image data illustrated in FIG. 13.

In step S723, the client 1 writes information about image data uploaded in step S722 into the database 12. Examples of the information about the uploaded images include a hash value of each image.

FIG. 16 will now be described. FIG. 16 illustrates a sequence in a case where the editing operation in which an image is replaced with a desired image is performed by the user using, for example, the screen illustrated in FIG. 4, after the automatic layout processing is completed.

In step S731, the client 1 replaces the image in response to an instruction from the user. For example, a target slot including an image to be replaced by the user is designated, and the image in the slot is replaced with a new image desired by the user. This new image may be selected from among the images corresponding to the uploaded analysis image data, or may be a new image different from the analysis image data.

In step S732, the client 1 acquires information about the replaced image from the database 12.

In step S733, the client 1 determines whether the print image data on the image replaced by the user is uploaded to the management system 5 based on the information acquired in step S732. For example, if the information acquired in step S732 does not include the hash value corresponding to the replaced image, the client 1 determines that the print image data corresponding to the replaced image is not uploaded. If the print image data is not uploaded, in step S722, the client 1 creates the print image data from the original image data on the replaced image, and uploads the created print image data to the storage 11. In step S723, the client 1 writes information about the uploaded image into the database 12.

As illustrated in FIGS. 15 and 16, uploading of only the print image data corresponding to the images actually laid out in the photo album eliminates the need for uploading the print image data corresponding to images that are not laid out in the photo album to the management system 5. This leads to a reduction in network traffic. Not only a reduction in network traffic, but also a reduction in the capacity of the storage 11 can be achieved.

Figure 17:
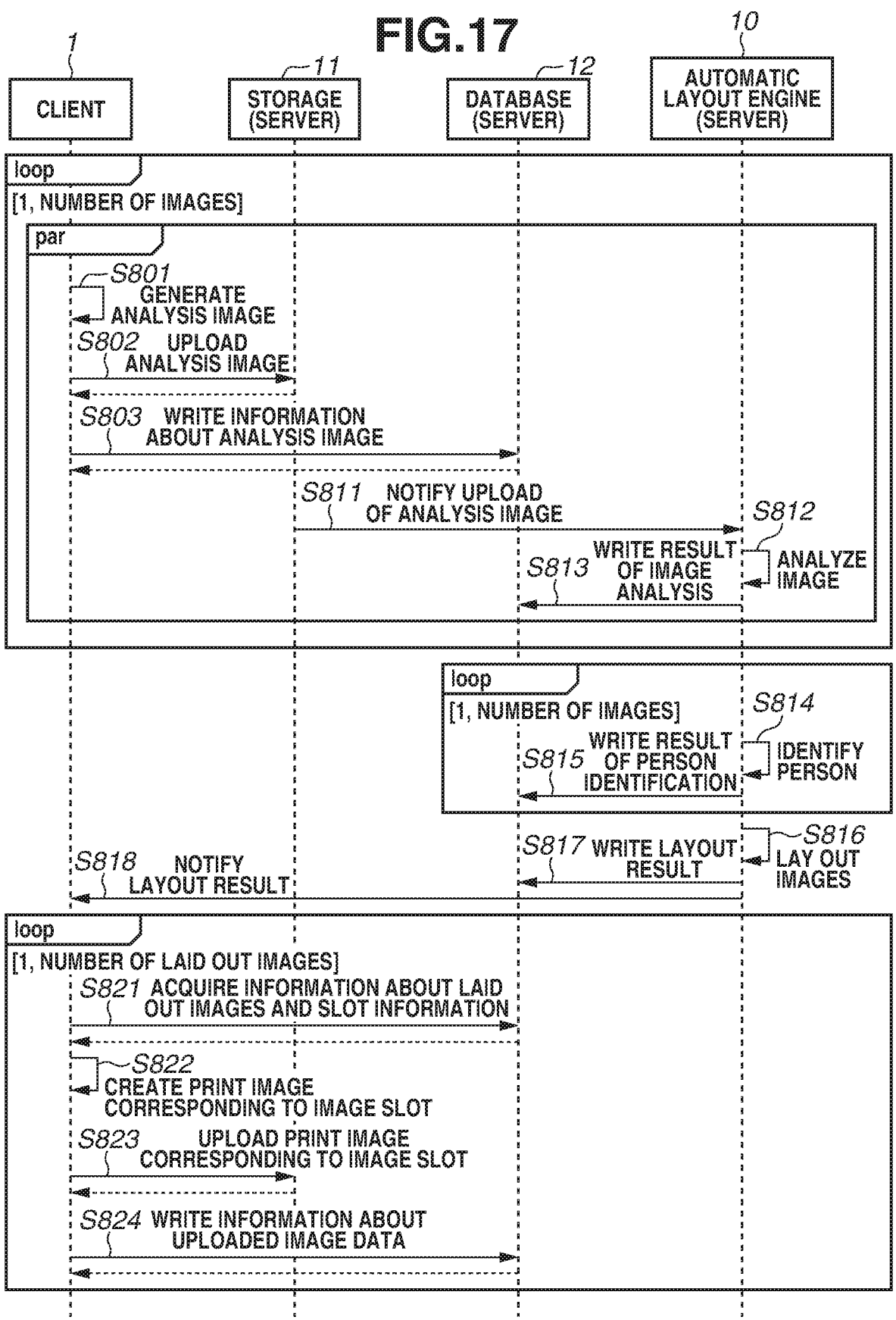
FIG. 17 is a sequence diagram according to an exemplary embodiment of the present disclosure.
Figure 18:
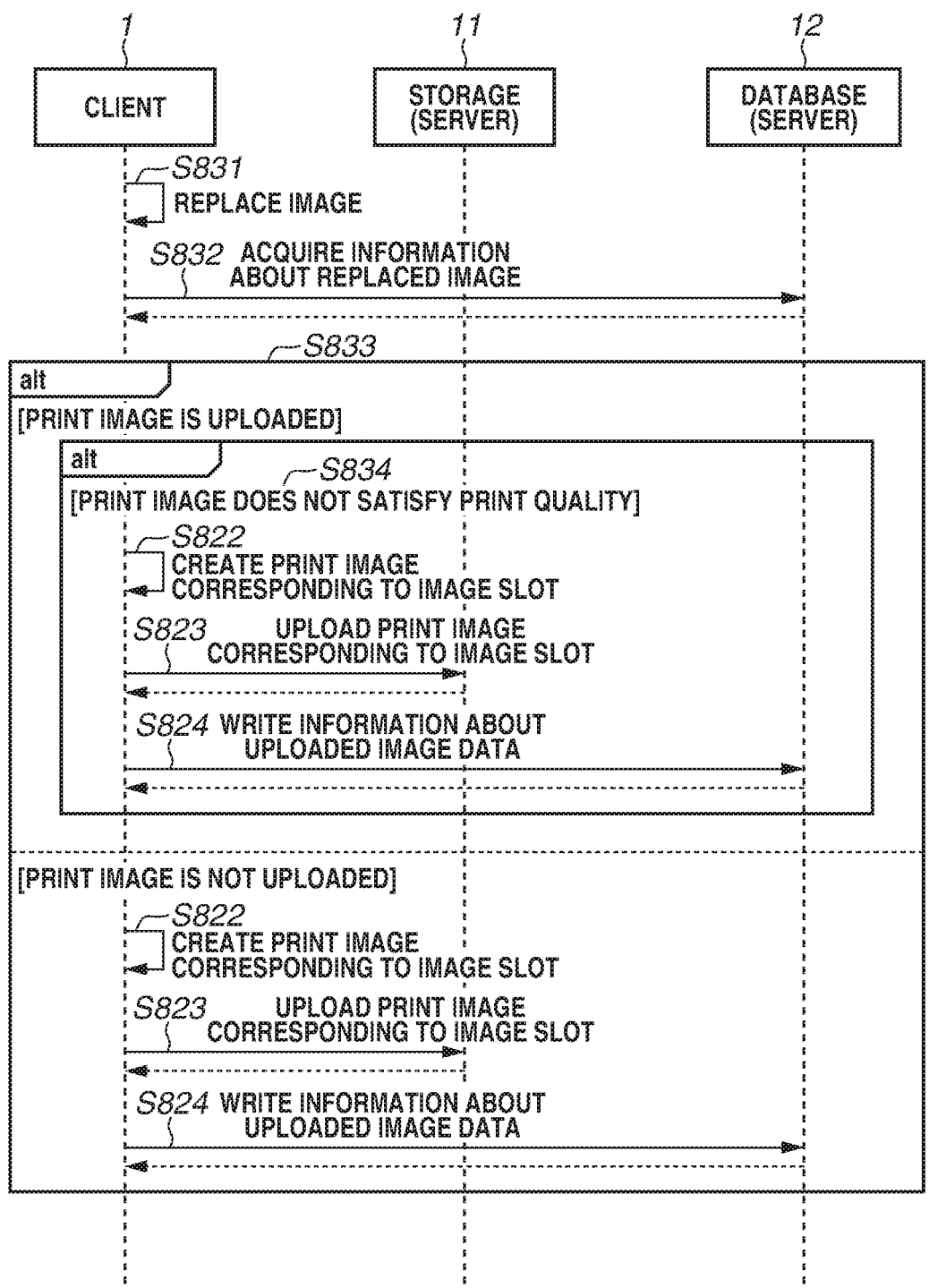
FIG. 18 is a sequence diagram according to an exemplary embodiment of the present disclosure.

FIGS. 17 and 18 each illustrate an example in which the client 1 uploads the print image data obtained by reducing the size of original image data to a size with which the print quality can be maintained in a target slot.

FIG. 17 will now be described. Steps S801 to S803 and steps S811 to S818 are similar to steps S601 to S603 and steps S611 to S618, respectively, and thus the descriptions thereof are omitted.

In step S821, the client 1 refers to the information in the database 12 and acquires information about the laid out analysis images and information about laid out image slots. Examples of the information about the laid out analysis images include a hash value of each image. The client 1 acquires the hash value, thus specifying which pictures are adopted for the photo album by the automatic layout engine 10. Examples of the information about the laid out image slots include a lengthwise size (long) and a crosswise size (wide) of each image slot.

In step S822, the client 1 generates the print image data corresponding to the image slots based on the size information about the image slots acquired in step S821. The print image data corresponding to the image slots will be described with an example. A resolution at which the print quality can be maintained is determined in many of the apparatuses that print a photo album. An image having a resolution lower than or equal to this resolution may be blurred when the image is printed, with the result that the print quality cannot be maintained. For example, a case will be described where the resolution at which the print quality of the apparatus that prints a photo album can be maintained is 100 dpi, the size of a target image slot is one inch long and two inches wide, and the size of the original image data is 1000 pixels long and 2000 pixels wide. The size of the image at which the print quality can be maintained for this image slot is 100 pixels long (one inch×100 dpi) and 200 pixels wide (one inch×200 dpi). Accordingly, the print image data for which the print quality can be maintained is image data obtained by reducing the size of the original image data including 1000 pixels long and 2000 pixels wide to a size of 100 pixels or more long and 200 pixels or more wide. The image created based on the size information about the image slot is hereinafter referred to as "print image data corresponding to the image slot".

In step S823, the client 1 uploads the print image data corresponding to the image slot generated in step S822 to the storage 11.

In step S824, the client 1 writes information about the print image data uploaded in step S823 into the database 12. The information to be written in this case relates to the size of the image. Examples of the information include the numbers of pixels long and the number of pixels wide.

After step S824 is performed, in step S831, the client 1 replaces the image based on an instruction from the user. For example, the user designates a target slot including the image to be replaced, and the image in the slot is replaced with any image desired by the user.

In step S832, the client 1 acquires, from the database 12, information about the replaced image.

In step S833, the client 1 determines whether the print image data corresponding to the image slot is uploaded to the management system 5 based on the information acquired in step S832. If there is no information about the print image data corresponding to the image slot, it is determined that the image data is not uploaded.

Here, if the client 1 determines that the print image data corresponding to the image slot is uploaded to the management system 5, the processing proceeds to step S834. Specifically, based on the information about the print image data corresponding to the image slot acquired in step S832, the client 1 determines whether the print image data satisfies the print quality for the image slot to be replaced. Assume that the print image data including 100 pixels long and 200 pixels wide is uploaded. Moreover, assume that the resolution at which the print quality of the apparatus that prints a photo album is 100 dpi, the size of the image slot to be replaced is two inches long and the four inches wide. In this case, the size of the image with which the print quality can be maintained is 200 pixels long (two inches×100 dpi) and 400 pixels wide (four inches×200 dpi). Accordingly, it is determined that the size (100 pixels long and 200 pixels wide) of the uploaded print image data is not enough to maintain the print quality.

If the print image data does not satisfy the print quality, in step S822, the client 1 re-creates the print image data corresponding to the image slot with the size with which the print quality can be maintained for the image slot to be replaced. In step S823, the client 1 uploads the re-created print image data to the storage 11. After the print image data is uploaded, in step S824, the client 1 writes the information about the print image data into the database 12.

Details of steps S822 to S824 are described above with reference to FIG. 17, and thus the detailed descriptions thereof are omitted.

The print image data corresponding to the image slot is created and the created print image data is uploaded to the management system 5 in FIGS. 17 and 18. Thus, uploading of the print image data corresponding to the image slot enables the upload of the print image data to the storage 11 after reducing the image size of the print image to a minimum size. Accordingly, the network traffic can be reduced as compared with, for example, a case where the original image data is uploaded. Not only a reduction in the network traffic, but also a reduction in the capacity of the storage 11 can be achieved.

In FIGS. 13 to 18, the original image or print image is uploaded. However, when, for example, the communication environment is poor, or when the communication speed is limited in a contract with a communication company, the print image cannot be uploaded. In such a case, analysis images may be used to create data on a photo album.

In FIGS. 13 to 18, the original image or print image data is uploaded after the layout processing is completed by the automatic layout engine 10. However, the original image data or print image data may be uploaded at a timing of placing an order after the user's editing operation is completed. Having done this, the original image data or print image data is uploaded at the timing of placing an order, which eliminates the need for uploading the original image data or print image data on pictures that are not laid out. As a result, an increase in network traffic in the entire system can be suppressed. Not only the reduction in the network traffic, but also a reduction in the capacity of the storage 11 can be achieved.

FIGS. 13 to 18 illustrate an example in which the storage 11 and the database 12 are configured separately from the automatic layout engine 10. However, the present disclosure is not limited to this example. Storage or a database may be constructed in the automatic layout engine 10 and the storage or database may be used. However, configuring the storage 11 or the database 12 separately from the automatic layout engine 10 enables the access to a storage service and database service as typified by a public cloud. This leads to an increase in availability.

Lastly, processing to be performed by the management system 5 to print a photo album in practice will be described. The management system 5 provides the client 1 with data about the edit screen illustrated in FIG. 4, and then receives layout information corresponding to the editing result obtained by the client 1. After that, for example, when the user performs payment processing via a screen to be displayed by operating "Add to Cart", the management system 5 specifies the print image data corresponding to pictures that are actually used for the album based on the layout information. The management system 5 transmits the layout information and the print image data corresponding to the pictures used for the album to a print system (not illustrated) (e.g., a print system including an information processing apparatus and a print apparatus) via the network 7, thereby issuing a print instruction. As a result, in the print system, print processing is executed based on the layout information and the print image data, thus enabling the album to be printed.

Other Exemplary Embodiments

While the exemplary embodiments described above have been described based on a configuration in which uploading of print image data is started after uploading of all analysis image data is completed, other configurations may be applicable. For example, uploading of print image data may be started after uploading of some of a plurality of pieces of analysis image data is completed. In such a configuration, the analysis image data is transmitted prior to the transmission of the print image data, so that the result illustrated in FIG. 4 can be also promptly presented to the user.

The exemplary embodiments described above illustrate an example in which a photo album is created using still images selected by the user. However, the present disclosure is not limited to this example. For example, the present disclosure is also applicable to a case where the user selects a moving image, and the client cuts out an optional number of still images from the moving image and uses the cut-out still images as the images selected by the user.

The exemplary embodiments described above illustrate an example in which the automatic layout engine 10 is used to execute the automatic layout processing. Alternatively, the management system 5 may perform the layout processing based on a manual operation by an operator.

The exemplary embodiments described above illustrate an example in which the automatic layout engine 10 is used to execute the automatic layout processing. Alternatively, the server side 2 may perform scoring by performing only the image analysis and then return the information to the client. A configuration in which the user manually lays out images based on these pieces of information in the client 1 may also be used. While the exemplary embodiments described above illustrate an example in which images are set on a template for a photo album, the present invention is not limited to this example. For example, images may be set on a template for a postcard. A product to be finally printed is not limited to a photo album.

According to an exemplary embodiment of the present disclosure, it is possible to improve user-friendliness.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-162153, filed Aug. 30, 2018, which is hereby incorporated by reference herein in its entirety.

What is claimed is:

1. An information processing system comprising:
an information processing apparatus; and
a server system,
wherein the information processing apparatus comprises:
at least one processor configured to cause the information processing apparatus to function as:
a generation unit configured to generate a plurality of pieces of analysis image data based on a plurality of images selected by a user; and
a first transmission unit configured to transmit the analysis image data generated by the generation unit to the server system, and
wherein the server system comprises:
at least one processor configured to cause the server system to function as:
a layout unit configured to execute layout processing based on the plurality of pieces of analysis image data transmitted by the first transmission unit; and
a transmission unit configured to transmit a result of the layout processing performed by the layout unit to the information processing apparatus,
wherein the information processing apparatus further includes a second transmission unit configured to transmit, to the server system, print image data determined based on the result of the layout processing received from the server system,
wherein a number of images corresponding to the determined print image data is smaller than a number of images selected by the user,
wherein the information processing apparatus further includes a determination unit configured to, in a case where at least one piece of the print image data determined based on the result of the layout processing is changed to other image data, determine whether the other image data is stored in the server system, and
wherein the information processing apparatus transmits print image data corresponding to the other image data in a case where the determination unit determines that the other image data is not stored in the server system.

2. An information processing apparatus comprising:
at least one processor configured to cause the information processing apparatus to function as:
a generation unit configured to generate a plurality of pieces of analysis image data based on a plurality of images selected by a user;
a first transmission unit configured to transmit the plurality of pieces of analysis image data generated by the generation unit to a server system;
a receiving unit configured to, in a case where the server system executes layout processing based on the plurality of pieces of analysis image data, receive a result of the layout processing; and
a second transmission unit configured to transmit, to the server system, print image data determined based on the received result of the layout processing, the print image data having a data size greater than a data size of the analysis image data, and a number of images corresponding to the determined print image data being smaller than a number of images selected by the user,
wherein in a case where the at least one piece of the print image data determined based on the result of the layout processing is changed to the other image data, the information processing apparatus determines whether the other image data is stored in the server system, and
wherein the information processing apparatus transmits print image data corresponding to the other image data in a case where the information processing apparatus determines that the other image data is not stored in the server system.

3. The information processing apparatus according to claim 2, wherein the analysis image data is generated by a size of original image data corresponding to the image selected by the user being reduced.

4. The information processing apparatus according to claim 2, wherein the print image data is original image data corresponding to the image selected by the user.

5. The information processing apparatus according to claim 2, wherein the print image data is generated by a size of original image data corresponding to the image selected by the user being reduced.

6. The information processing apparatus according to claim 2, wherein the at least one processor is further configured to cause the information processing apparatus to function as a specifying unit configured to specify an image to be used for the layout processing from a plurality of the images selected by the user,
wherein the print image data corresponding to the specified image is transmitted to the server system, and the print image data corresponding to an image different from the specified image is not transmitted to the server system.

7. The information processing apparatus according to claim 2, wherein the print image data is generated based on a size of a slot in which the image is arranged in the layout processing.

8. The information processing apparatus according to claim 2, wherein the result of the layout processing is displayed on a Web browser.

9. The information processing apparatus according to claim 2, wherein an album is printed based on the result of the layout processing and the print image data.

10. An information processing method comprising:
generating a plurality of pieces of analysis image data based on a plurality of images selected by a user;

transmitting, as a first transmission, the generated plurality of pieces of analysis image data to a server system;

in a case where the server system executes layout processing based on the plurality of pieces of analysis image data, receiving a result of the layout processing; and transmitting, as a second transmission, print image data determined based on the received result of the layout processing, the print image data having a data size greater than a data size of the analysis image data, and a number of images corresponding to the determined print image data being smaller than a number of images selected by the user, wherein in a case where the at least one piece of the print image data determined based on the result of the layout processing is changed to the other image data, the information processing apparatus determines whether the other image data is stored in the server system, and wherein the information processing apparatus transmits print image data corresponding to the other image data in a case where the information processing apparatus determines that the other image data is not stored in the server system.

11. The information processing method according to claim 10, wherein the analysis image data is generated by a size of original image data corresponding to the image selected by the user being reduced.

12. The information processing method according to claim 10, wherein the print image data is original image data corresponding to the image selected by the user.

13. The information processing method according to claim 10, wherein the print image data is generated by a size of original image data corresponding to the image selected by the user being reduced.

14. The information processing method according to claim 10, further comprising causing a computer to function as a specifying unit configured to specify an image to be used for the layout processing from a plurality of the images selected by the user, wherein the print image data corresponding to the specified image is transmitted to the server system, and the print image data corresponding to an image different from the specified image is not transmitted to the server system.

15. The information processing method according to claim 10, wherein the print image data is generated based on a size of a slot in which an image is arranged in the layout processing.

16. The information processing method according to claim 10, wherein the result of the layout processing is displayed on a Web browser.

17. The information processing method according to claim 10, wherein an album is printed based on the result of the layout processing and the print image data.

18. A non-transitory storage medium storing a program for causing an information processing apparatus to execute:

generating a plurality of pieces of analysis image data based on a plurality of images selected by a user;

transmitting, as a first transmission, the generated plurality of pieces of analysis image data to a server system;

in a case where the server system executes layout processing based on the plurality of pieces of analysis image data, receiving a result of the layout processing; and transmitting, as a second transmission, print image data determined based on the received result of the layout processing, the print image data having a data size greater than a data size of the analysis image data, and a number of images corresponding to the determined print image data being smaller than a number of images selected by the user, wherein in a case where the at least one piece of the print image data determined based on the result of the layout processing is changed to the other image data, the information processing apparatus determines whether the other image data is stored in the server system, and wherein the information processing apparatus transmits print image data corresponding to the other image data in a case where the information processing apparatus determines that the other image data is not stored in the server system.

19. The non-transitory storage medium according to claim 18, wherein the analysis image data is generated by a size of original image data corresponding to the image selected by the user being reduced.

20. The non-transitory storage medium according to claim 18, wherein the print image data is original image data corresponding to the image selected by the user.

21. The non-transitory storage medium according to claim 18, wherein the print image data is generated by a size of original image data corresponding to the image selected by the user being reduced.

22. The non-transitory storage medium according to claim 18, wherein the print image data is generated based on a size of a slot in which the image is arranged in the layout processing.

* * * * *